United States Patent
Valdez et al.

(10) Patent No.: US 12,494,962 B2
(45) Date of Patent: *Dec. 9, 2025

(54) AUGMENTED REALITY ENVIRONMENT FOR PROVIDING INSTRUCTIONS FOR REPAIRING A PON DEVICE

(71) Applicant: FRONTIER COMMUNICATIONS HOLDINGS, LLC, Dallas, TX (US)

(72) Inventors: John Valdez, Copper Canyon, TX (US); Bryan Pauling, Rochester, NY (US); Eduardo Flores, Frisco, TX (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/962,086

(22) Filed: Nov. 27, 2024

(65) Prior Publication Data

US 2025/0323821 A1    Oct. 16, 2025

Related U.S. Application Data

(63) Continuation of application No. 18/636,823, filed on Apr. 16, 2024, now Pat. No. 12,199,814.

(51) Int. Cl.
*H04L 41/0631* (2022.01)
*G06T 11/00* (2006.01)
(Continued)

(52) U.S. Cl.
CPC .......... *H04L 41/0631* (2013.01); *G06T 11/00* (2013.01); *H04L 41/069* (2013.01);
(Continued)

(58) Field of Classification Search
CPC .............................. G06T 11/00; G06T 19/006
See application file for complete search history.

(56) References Cited

U.S. PATENT DOCUMENTS

| 12,136,944 B1 | 11/2024 | Valdez et al. |
| 12,267,104 B1 | 4/2025 | Valdez et al. |

(Continued)

FOREIGN PATENT DOCUMENTS

| WO | WO-9914929 | 3/1999 |
| WO | WO-2011048207 | 4/2011 |

OTHER PUBLICATIONS

Office Action for U.S. Appl. No. 18/636,808, dated Jun. 11, 2024.
(Continued)

*Primary Examiner* — Charles Tseng
(74) *Attorney, Agent, or Firm* — MARSHALL, GERSTEIN & BORUN LLP

(57) ABSTRACT

Techniques for augmenting repair of a network failure in a Passive Optical Network (PON) include receiving sensor data at a client device indicating a current environment that includes an optical network terminal (ONT) in a PON. The PON includes an optical line terminal (OLT) optically connected to the ONT via one or more optical fibers. The client device analyzes the current environment to detect a cause of a network failure corresponding to the ONT, and generates a set of instructions for repairing the ONT based on the detected cause of the network failure. Then the client device provides the set of instructions for a user to follow to repair the ONT. The set of instructions are provided as the user repairs the ONT.

14 Claims, 15 Drawing Sheets

(51) Int. Cl.
  *H04L 41/069*    (2022.01)
  *H04Q 11/00*     (2006.01)
(52) U.S. Cl.
  CPC ...... *H04Q 11/0067* (2013.01); *G06T 2200/24* (2013.01); *H04Q 2011/0083* (2013.01)

(56)           References Cited

U.S. PATENT DOCUMENTS

| | | |
|---|---|---|
| 2004/0160905 A1 | 8/2004 | Bernier et al. |
| 2007/0217788 A1* | 9/2007 | Gao ................... H04Q 11/0067 398/5 |
| 2008/0031621 A1 | 2/2008 | Kuo et al. |
| 2012/0075343 A1* | 3/2012 | Chen .......................... G06T 7/73 345/633 |
| 2015/0091780 A1* | 4/2015 | Lyren ................... G02B 27/017 345/8 |
| 2018/0006719 A1* | 1/2018 | Cress ...................... H04L 43/08 |
| 2018/0337785 A1 | 11/2018 | Sanciangco et al. |
| 2022/0141082 A1* | 5/2022 | Brun ................... H04L 41/0654 709/223 |
| 2024/0171524 A1 | 5/2024 | Bostoen et al. |
| 2024/0177436 A1* | 5/2024 | Ito ........................ G02B 27/017 |

OTHER PUBLICATIONS

Office Action for U.S. Appl. No. 18/889,728, dated Nov. 20, 2024.
Office Action for U.S. Appl. No. 19/062,499, dated Apr. 24, 2025.
Office Action for U.S. Appl. No. 18/636,823, dated Aug. 29, 2024.
Office Action for U.S. Appl. No. 18/636,823, dated Jun. 21, 2024.

\* cited by examiner

250

AUGMENTED REALITY ENVIRONMENT FOR PROVIDING INSTRUCTIONS FOR REPAIRING A PON DEVICE

CROSS-REFERENCE TO RELATED APPLICATIONS

The present application is a continuation of U.S. application Ser. No. 18/636,823 filed Apr. 16, 2024, entitled "Augmented Reality Environment for Providing Instructions for Repairing a PON Device," the disclosure of which is incorporated herein by reference in its entirety for all purposes.

FIELD OF THE DISCLOSURE

This disclosure relates generally to passive optical networks (PONs), and, more particularly, to systems and methods for directly connecting to a device in the PON and presenting diagnostic information to assist in repairing the device.

BACKGROUND

A conventional PON includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

When a PON experiences a network failure (e.g., equipment malfunctions, signal loss, network congestion, broken optical fibers, or other technical issues), the effects are typically observed by customers or end-users at locations at which last mile termination units are disposed. For example, a customer may observe a slowing down or lack of fidelity of PON services at his or her location, and may contact the PON service provider for assistance.

However, a technician typically needs to have years of experience with troubleshooting to understand how to properly repair the network failure. Additionally, the technician may have difficulty locating the network equipment within a customer's residence. Moreover, it can be time consuming for the technician to correctly diagnose the problem before beginning the repair. Even if the technician is able to read information from the ONT, technicians may need years of training and experience before they can quickly identify the problem and resolve the issue.

SUMMARY

To obtain diagnostic information for repairing an ONT, a user directly connects their client device to an ONT or another device in the PON (e.g., an FDT, an FDH, etc.) by establishing a communication session with the ONT via a short-range communication link. For example, the client device and the ONT may connect using Wi-Fi, Bluetooth, or near field communication (NFC). Then the ONT can provide real-time diagnostic information from the ONT to the client device to assist the user in diagnosing and repairing the failure. In some implementations, the ONT may run diagnostic tests and/or may receive requests from the client device to run diagnostic tests, such as a dial tone test to test whether the ONT can successfully complete a call with the client device or a speed test to test download or upload rates at the ONT. Additionally, the ONT may receive diagnostic information from other devices in the PON. For example, the ONT may receive diagnostic information from the FDT, FDH, and/or OLT optically connected to the ONT.

In this manner, a user such as a technician may review the diagnostic information and identify the source of the network failure. Moreover, by directly connecting to the ONT, the ONT does not have to send information over the optical fibers to the OLT and to a server before it is sent to the client device. This can be particularly problematic when there is a network failure in the optical fibers or at another component of the PON. The server may not be able to receive the information needed to assess and diagnose the problem. By directly connecting the client device to the ONT via a short-range communication link, the client device can receive real-time diagnostic information even when data is not being received at the OLT from the ONT.

Furthermore, the client device may store a geospatial tag indicating the location of the ONT. Then when the client device is within a threshold distance of the ONT, the client device may automatically connect to the ONT. Moreover, the client device may present a map display indicating the location of the ONT relative to the user to direct the user to the ONT or to another component of the PON, such as the FDT or the FDH.

In addition to diagnosing the problem, the client device may determine how to repair the problem and may provide step-by-step instructions to the user for repairing the problem. In this manner, the user does not necessarily have to be a technician to perform the repair. Instead, a customer can make their own repairs by following the step-by-step instructions. In some implementations, the client device includes a transparent display, such as a camera view depicting the area in front of the user in the camera view. For example, the client device may be a wearable device such as a virtual reality (VR) and/or augmented reality (AR) headset or smart glasses. When the user is facing the ONT, the transparent display may include a camera view of the ONT with the step-by-step instructions overlaid on the transparent display. The instructions may be presented in an area of the transparent display which does not obstruct the user's view of the ONT, so that the user can simultaneously view the instructions and the ONT to perform the repairs while reading the instructions.

Additionally, the client device may overlay AR features on the transparent display to further guide the user when making the repair. For example, the client device may analyze images in the camera view to identify objects within the camera view, such as the ONT, optical fibers coupled to the ONT, the ports on the ONT, light emitting diodes (LEDs) on the ONT, etc. The client device may then overlay AR features to highlight certain components of the ONT corresponding to the instructions for repairing the ONT. For example, an instruction may be to check that a particular LED blinks three times. The client device may overlay an AR feature over the particular LED (e.g., a transparent yellow box) so that the user knows where to look to verify that the LED blinked three times. Another instruction may be to replace a particular optical fiber connected to the ONT. The client device may overlay an AR feature (e.g., a transparent green oval) over the particular fiber to highlight the particular fiber. In other implementations, the client device presents audio instructions via a speaker. In any event, the client device provides step-by-step instructions to the user based on diagnostics that the ONT obtained to assist the user in repairing the ONT. By overlaying AR features over portions of the camera view that correspond to the instructions, the client device makes it easier for the user to successfully perform the repair. This may increase the speed and the success rate of repairs for devices in a PON.

If the ONT cannot be repaired and needs to be replaced, the client device may automatically order a new ONT to be delivered to the customer's residence. Then a user can install the new ONT using instructions provided by the client device and/or using the AR features overlaid on the transparent display to guide the user.

In an embodiment, a method for repairing a network failure in a Passive Optical Network (PON) is provided. The method includes establishing a communication session, by a client device via a short-range communication link, with an optical network terminal (ONT) in a PON. In response to establishing the communication session, the method includes receiving, at the client device from the ONT via the short-range communication link, diagnostic information related to a network failure corresponding to the ONT. Additionally, the method includes presenting, by the client device, the diagnostic information to a user for the user to repair the ONT based on the received diagnostic information.

In another embodiment, a client device for repairing a network failure in a Passive Optical Network (PON) includes one or more processors, and a non-transitory computer-readable memory storing instructions thereon. When executed by the one or more processors, the instructions cause the client device to establish, via a short-range communication link, a communication session with an optical network terminal (ONT) in a PON. In response to establishing the communication session, the instructions cause the client device to receive, from the ONT via the short-range communication link, diagnostic information related to a network failure corresponding to the ONT, and present the diagnostic information to a user for the user to repair the ONT based on the received diagnostic information.

In yet another embodiment, a non-transitory computer-readable memory stores instructions thereon. When executed by one or more processors, the instructions cause the one or more processors to establish, via a short-range communication link, a communication session with an optical network terminal (ONT) in a PON. In response to establishing the communication session, the instructions cause the one or more processors to receive, from the ONT via the short-range communication link, diagnostic information related to a network failure corresponding to the ONT, and present the diagnostic information to a user for the user to repair the ONT based on the received diagnostic information.

In another embodiment, a method for augmenting repair of a network failure in a Passive Optical Network (PON) is included. The method includes receiving, via one or more sensors in a client device, sensor data indicating a current environment that includes an optical network terminal (ONT) in a PON. The PON includes an optical line terminal (OLT) optically connected to the ONT via one or more optical fibers. The method also includes analyzing, by the client device, the current environment to detect a cause of a network failure corresponding to the ONT, generating, by the client device, a set of instructions for repairing the ONT based on the detected cause of the network failure, and providing, by the client device, the set of instructions for a user to follow to repair the ONT. The set of instructions are provided as the user repairs the ONT.

In yet another embodiment, a client device for augmenting repair of a network failure in a Passive Optical Network (PON) includes one or more sensors, one or more processors, and a non-transitory computer-readable memory storing instructions thereon. When executed by the one or more processors, the instructions cause the client device to receive, via the one or more sensors, sensor data indicating a current environment including an optical network terminal (ONT) in a PON. The PON includes an optical line terminal (OLT) optically connected to the ONT via one or more optical fibers. The instructions also cause the client device to analyze the current environment to generate a set of instructions for repairing the ONT, and provide the set of instructions for a user to follow to repair the ONT. The set of instructions are provided as the user repairs the ONT.

In another embodiment, a non-transitory computer-readable memory stores instructions thereon. When executed by one or more processors, the instructions cause the one or more processors to receive, via one or more sensors, sensor data indicating a current environment including an optical network terminal (ONT) in a PON. The PON includes an optical line terminal (OLT) optically connected to the ONT via one or more optical fibers. The instructions also cause the one or more processors to analyze the current environment to generate a set of instructions for repairing the ONT, and provide the set of instructions for a user to follow to repair the ONT, wherein the set of instructions are provided as the user repairs the ONT.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Figure 1:
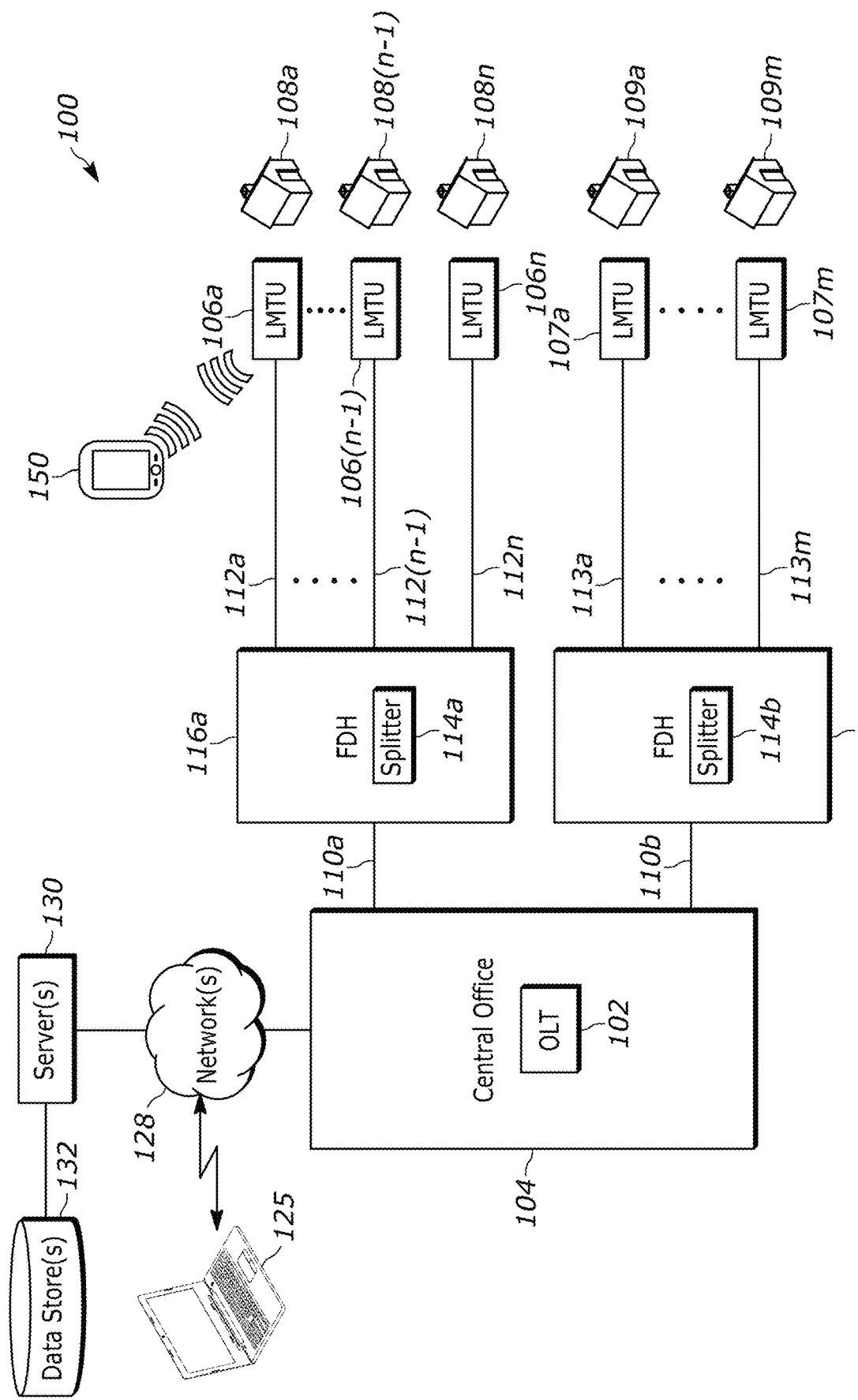
FIG. 1 is a block diagram of an example passive optical network (PON) in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Disclosed examples of the disclosure provide a number of advantages over existing techniques for repairing a PON. Reference will now be made in detail to non-limiting examples, some of which are illustrated in the accompanying drawings.

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units 106a, . . . ,106n at respective customer premises 108a, . . . ,108n. The last mile termination units 106a, . . . ,106n may be located outside and/or inside the customer premises or locations 108a, . . . ,108n. Each last mile termination unit 106a, . . . ,106n may be, for example, an optical network unit (ONU) or an optical network terminal (ONT). In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110a from the OLT 102 (which is interchangeably referred to herein as an "F1 optical fiber 110a" or a "primary optical fiber 110a") serves the one or more last mile termination units 106a, . . . , 106n via respective distribution optical fibers 112a, . . . , 112n (which are interchangeably referred to herein as "F2 optical fibers 112a, . . . , 112n" or "secondary optical fibers 112a, . . . , 112n"). In the illustrated example, the first feeder optical fiber 110a is optically coupled to the plurality of last mile termination units 106a, . . . , 106n via an example one-to-many optical splitter 114a which is disposed, located, implemented, etc. in an example fiber distribution hub (FDH) 116a. In some arrangements, the FDH 116a is located within a geographic area (e.g., a neighborhood) such that the customer premises 108a, . . . , 108n are proximally close to the FDH 116a, and typically each of the customer premises 108a, . . . , 108n and respective last mile termination units 106a, . . . , 106n is disposed at a different optical distance from the FDH 116a. An "optical distance," as generally utilized herein, refers to a distance over which an optical signal travels.

In embodiments, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or primary optical fiber 110b from the OLT 102 that is optically coupled to another plurality of last mile termination units 107a-107m at respective customer premises 109a-109m via another many-to-one optical splitter 114b included in another fiber distribution hub 116b and via respective secondary optical fibers 113a-113m.

As utilized herein, the "components" of the PON 100 generally refer to the devices, nodes, and optical fibers of the PON 100. For example, the components of the PON 100 shown in FIG. 1 may include the OLT 102, the FDHs 116a, 116b, the splitters 114a, 114b, the LMTUs 106a-106n and 107a-107m, and the optical fibers interconnecting the devices or nodes, e.g., the optical fibers 110a-110b, 112a-112n, and 113a-113m.

In some scenarios, an optical terminal (e.g., the OLT 102 and/or one or more the last mile termination units 106a-106n,107a-107m) communicates with a computing device. For example, the OLT 102 and/or the one or more LMTUs 106a-106n, 107a-107m may transmit or receive data from a computing device 125 (e.g., a laptop, a computer, a tablet, a mobile phone, etc.) associated with a service technician or other agent of the PON 100 or a computing device associated with a customer.

In some examples, the computing device 125 communicates with an LMTU 106a-106n,107a-107m via one or more networks 128 (which may include one or more wired and/or wireless private networks and/or public networks, such as the Internet). In other examples, a client computing device 150 (also referred to herein as a "client device") communicates directly with the LMTU 106a-106n,107a-107m by establishing a communication session with the LMTU 106a-106n,107a-107m over a short-range communication link, such as Bluetooth, Wi-Fi, or near field communication (NFC). The client device 150 may also be associated with a service technician, other agent of the PON 100, or a customer. Then during the communication session, the client device 150 and the LMTU 106a-106n,107a-107m may directly transmit information back and forth to each other. For example, the LMTU 106a-106n,107a-107m may transmit diagnostic information to the client device 150 which may be presented on a user interface of the client device 150 via a PON repair application. The client device 150 may transmit control signals to the LMTU 106a-106n,107a-107m for the LMTU 106a-106n,107a-107m to perform diagnostic tests, such as a dial tone test or a speed test.

The client device 150 may be a portable device such as a smart phone or a tablet computer, for example. The client device 150 may also be a laptop computer, a desktop computer, a personal digital assistant (PDA), a wearable device such as a smart watch or smart glasses, a virtual reality headset, etc.

The client device 150 may include one or more processor(s) and a memory storing machine-readable instructions executable on the processor(s). The processor(s) may include one or more general-purpose processors (e.g., CPUs), and/or special-purpose processing units (e.g., graphical processing units (GPUs)). The memory may be a non-transitory memory and can include one or several suitable memory modules, such as random access memory (RAM), read-only memory (ROM), flash memory, other types of persistent memory, etc. The memory may store instructions for implementing a PON repair application for directly connecting to an LMTU 106a-106n,107a-107m and establishing a communication session with the LMTU 106a-106n,107a-107m to receive diagnostic information for identifying the cause of a network failure. The PON repair application may also provide instructions for repairing the LMTU 106a-106n,107a-107m and/or may present other graphical indications to guide a user through a repair.

Additionally, the client device 150 may include sensors, such as a positioning sensor (e.g., a Global Positioning System (GPS)), an accelerometer, an infrared sensor, a camera, a depth sensor such as a light detection and ranging (lidar) sensor, an electromagnetic sensor, etc. The client device 150 may also include a network interface for communicating with devices over short-range communication links, such as Bluetooth, Wi-Fi, or NFC. The network interface may enable communication with other devices (e.g., the OLT 102, the last mile termination units 106a, 106n, the one or more servers 130, the computing device 125, etc.) via any suitable networks such as the PON 100 and/or the network(s) 128. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

Furthermore, the client device 150 may include a display. The display may be a transparent display with camera views of real-world imagery. For example, when the client device 150 is smart glasses or a virtual reality headset, the transparent display may be presented in front of the user's eyes. Then the client device 150 may present augmented reality features on the transparent display overlaying the real-world imagery to help guide the user.

Additionally and/or alternatively, the client device 150 or an optical terminal in the PON 100 may communicate with one or more servers 130 of the PON 100 that are used to manage the PON 100, the network(s) 128, etc. For example, the one or more servers 130 may schedule and execute diagnostics of various components of the PON 100 and/or of the PON 100 as a whole, generate alerts and alarms, initiate various actions, provide user interfaces, which may include graphical user interfaces (e.g., at the computing device 125), log, historize, and/or otherwise store data generated by and associated with the PON 100 (e.g., in one or more data stores 132), and the like. For example, one or more applications may execute at the server(s) 130 and/or the server(s) may host one or more services to provide management, administrative, and/or test functionalities of the PON 100.

In another example, the PON repair application may communicate with the server(s) 130 to transmit diagnostic information to the server(s), receive repair instructions from the server(s) 130, receive a description of an identified root cause of the network failure from the server(s), etc. In some implementations, the entire functionality of the PON repair application may be executed on the server(s) 130. In other implementations, the PON repair application does not communicate with a server 130 and performs its functionality locally on the client device 150. In yet other implementations, the client device 150 and the server(s) 130 each perform a portion of functionality of the PON repair application.

Various information and data associated with, utilized by, and/or generated by the PON 100 may be stored in the data stores 132 of the PON 100. For example, the data store(s) 132 may store sets of instructions for repairing LMTUs 106a-106n,107a-107m, where each set of instructions corresponds to a different root cause of the network failure. For example, if the root cause is a broken optical fiber 112a, the corresponding instructions may be for replacing the optical fiber 112a. If the root cause is that the optical fiber 112a is dirty, the corresponding instructions may be for cleaning the optical fiber 112a. The data store(s) 132 may also store records of customer contact events with a technical support organization supporting the PON 100, service call records, records of operating conditions and events which occurred, logbooks, and the like.

Additionally, the data store(s) 132 may store applications which may execute at the one or more servers 130, and/or which may be downloaded or otherwise provided to the technician computing device 125 for installation and execution thereon. Further, the data store(s) 132 may store data indicative of performance, faults, diagnostics, statuses, states, and/or other data corresponding to the components of the system 100. Still further, the data store(s) 132 may store data indicative of the architecture, infrastructure, and component connectivity of the PON 100, including identifications of various PON components and indications of which PON components connect to which other PON components. Of course, the data store(s) 132 may store any updates to any and all of the information and data stored therein.

The example servers 130, optical terminals (e.g., any of the OLT 102, the last mile termination units 106a, 106n), and/or the example computing devices 125, 150 may include a processing platform capable of executing instructions to, for example, implement operations of the example methods described herein, as may be represented by the flowcharts of the drawings that accompany this description. Other example logic circuits capable of, for example, implementing operations of the example methods described herein include a field programmable gate array (FPGA), an application specific integrated circuit (ASIC), a programmable logic device (PLD), and a field programmable logic device (FPLD). The processing platform may be, for example, one or more servers, a cloud computing system, a computer, a workstation, a laptop, a mobile device (e.g., a cell phone, a smart phone, a tablet such as an IPAD™), or any other type of computing device or system.

The example processing platform includes one or more processors, one or more memories, one or more network interfaces, one or more input/output (I/O) interfaces, and/or a set of data stores, all of which are interconnected via one or more address/data bus or communication links.

The processors may be implemented using hardware, and may include a semiconductor based (e.g., silicon-based) device. The processors may be, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the processors may be a field programmable gate array (FPGA), an application specific integrated circuit (ASIC), etc. that implements operations of the example methods described herein without executing instructions.

The memories are accessible by the processors (e.g., via a memory controller). The example processors interact with the memories to obtain, for example, machine-readable instructions stored in the memories corresponding to, for example, the operations represented by the flowcharts of this disclosure. The example processors may also interact with the memories to store data, such as data formed or used during execution of machine-readable instructions. Example memories include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the processing platform to provide access to the machine-readable instructions stored thereon.

The example processing platform includes one or more communication interfaces such as, for example, the one or more network interfaces, and/or the one or more input/output (I/O) interfaces. The communication interface(s) enable the processing platform to communicate with, for example, another device, system, etc. (e.g., the OLT 102, the last mile termination units 106a, 106n, the one or more servers 130, the computing device 125, the one or more data stores 132, etc., any other database, and/or any other machine).

The example processing platform includes the network interface(s) to enable communication with other machines (e.g., the OLT 102, the last mile termination units 106a, 106n, the one or more servers 130, the computing device 125, etc.) via, for example, one or more networks such as the PON 100 and/or the network(s) 128. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

The example, processing platform includes the input/output (I/O) interface(s) (e.g., a Bluetooth® interface, a near-field communication (NFC) interface, a universal serial bus (USB) interface, a serial interface, an infrared interface, a PCI express interface, etc.) to enable the processors to communicate with peripheral I/O devices and/or other communication systems. For example, the I/O interface(s) may be used to control a light source, enable receipt of user input (e.g., from a touch screen, a keyboard, a navigation device such as mouse, touch pad, joystick or trackball, a microphone, a button, etc.) and communicate output data (e.g., visual indicators, instructions, data, images, etc.) to the user (e.g., via a display, a speaker, a printer, a communication interface, an antenna, etc.). The I/O interface(s) typically include a graphics driver card, graphics driver chip and/or graphics driver processor to drive a display when a display is present.

In some examples, the processing platform also includes, or is otherwise communicatively coupled to, a set of data stores or other data storage mechanisms (one or more of a HDD, optical storage drive, solid state storage device, CD, CD-ROM, DVD, Blu-ray disk, RAID, data storage bank, etc.). The set of data stores may include the example data stores 132.

To connect to an LMTU 106a to establish a communication session between the client device 150 and the LMTU 106a, a user may tap the client device 150 to the LMTU 106a to cause the PON repair application to transmit an NFC signal to the LMTU 106a requesting to pair the devices. The LMTU 106a may receive the NFC signal and establish a communication session between the two devices 150, 106a in response to the request. Then the client device 150 and the LMTU 106a may transmit NFC communications back and forth to each other with real-time information, such as diagnostic information from the LMTU 106a, and control signals from the client device 150 for the LMTU 106a to execute diagnostic tests.

In another example, the client device 150 and the LMTU 106a may connect via Wi-Fi. For example, the LMTU 106a may broadcast a Wi-Fi signal. When the client device 150 is within communication range of the LMTU 106a, the PON repair application may receive the Wi-Fi signal and may request to connect to the LMTU 106a via the broadcasted Wi-Fi network. In some implementations, the PON repair application may provide a password for connecting to the LMTU 106a. The LMTU 106a may receive the request and establish a communication session between the two devices 150, 106a. In some implementations, the LMTU 106a may authenticate the client device 150 using the received password before establishing the communication session. Then the client device 150 and the LMTU 106a may transmit Wi-Fi communications back and forth to each other with real-time information, such as diagnostic information from the LMTU 106a, and control signals from the client device 150 for the LMTU 106a to execute diagnostic tests.

In some implementations, the PON repair application may store a geospatial tag indicating the location of the LMTU 106a. For example, the PON repair application may determine the location of the LMTU 106a based on the GPS location of the client device 150 while the client device 150 is connected to the LMTU 106a. Then when the user is at the same location at a later time, the PON repair application may automatically connect to the Wi-Fi for the LMTU 106a. In another example, the PON repair application may determine the location of the LMTU 106a based on electromagnetic (EM) data detected from the client device 150 while the client device 150 is connected to the LMTU 106a. The PON repair application may compare the EM data to known EM data at various locations to determine the location of the LMTU 106a. Still further, if the user has trouble finding the LMTU 106a, the PON repair application may use the stored geospatial tag to direct the user to the LMTU 106a.

If the user is within communication range of the LMTU 106a, the PON repair application may precisely locate the LMTU 106a relative to the user's location based on properties of the Wi-Fi signals communicated between the devices. For example, the PON repair application may determine the round trip time (RTT) it takes to transmit a message to the LMTU 106a and receive a response message back from the LMTU 106a. The PON repair application can determine the distance from the devices 150, 106a based on the round trip time for the communications back and forth. For example, the PON repair application can calculate the distance, D, as ½ of c×RTT, where c is the speed of light. Then the PON repair application may present an indication of the distance to the LMTU 106a to the user to direct the user to the LMTU 106a.

The PON repair application may also determine the direction in which the user needs to travel to locate the LMTU 106a based on the angle of arrival of communications between the client device 150 and the LMTU 106a. For example, the client device 150 may have multiple antennas for receiving short-range communications. The client device 150 may receive a communication from the LMTU 106a at each of its antennas, where the antennas are located at different positions within the client device 150. The PON repair application may then determine the angle of arrival of the communication based on a time difference at which each of the antennas received the communication. In other implementations, the LMTU 106a may have multiple antennas for receiving short-range communications and may determine the angle of arrival of a communication based on a time difference at which each of the antennas received the communication. In any event, the PON repair application may present an indication of the direction in which the user needs to travel to locate the LMTU 106a to direct the user to the LMTU 106a. For example, the PON repair application may present a map display with an indication of the location of the LMTU 106a and an indication of the location of the user relative to the LMTU 106a. The PON repair application may also provide navigation directions for traveling to the LMTU 106a, such as "Go downstairs into the basement and the LMTU 106a is to your left."

In other implementations, the PON repair application may determine the direction in which the user needs to travel to locate the LMTU 106a based on the EM data and/or accelerometer data. For example, the PON repair application may determine a change in position of the user based on the accelerometer data and/or a change in the EM data. Then the PON repair application may determine the direction in which the user is currently traveling based on the change in position and can provide directions to the LMTU 106a using the user's current location and their direction of travel.

In some implementations, the PON repair application may also connect to and/or receive navigation information to other optical terminals in the PON, such as an FDH 116a, FDT, or OLT 102.

Figure 5:
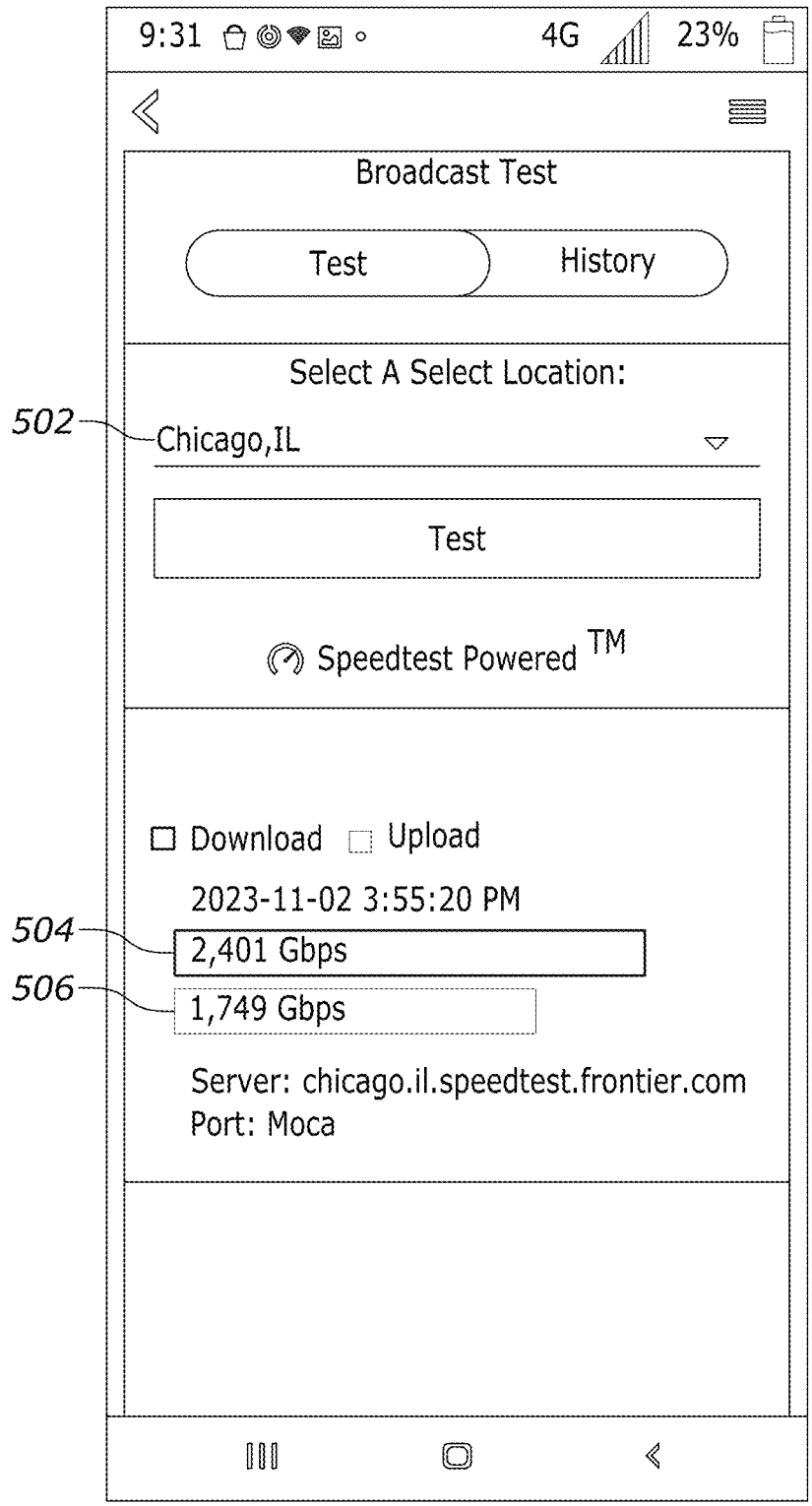
FIG. 5 illustrates an example display of a PON repair application for executing a speed test for the ONT, which may be presented on a client device.
Figure 6A:
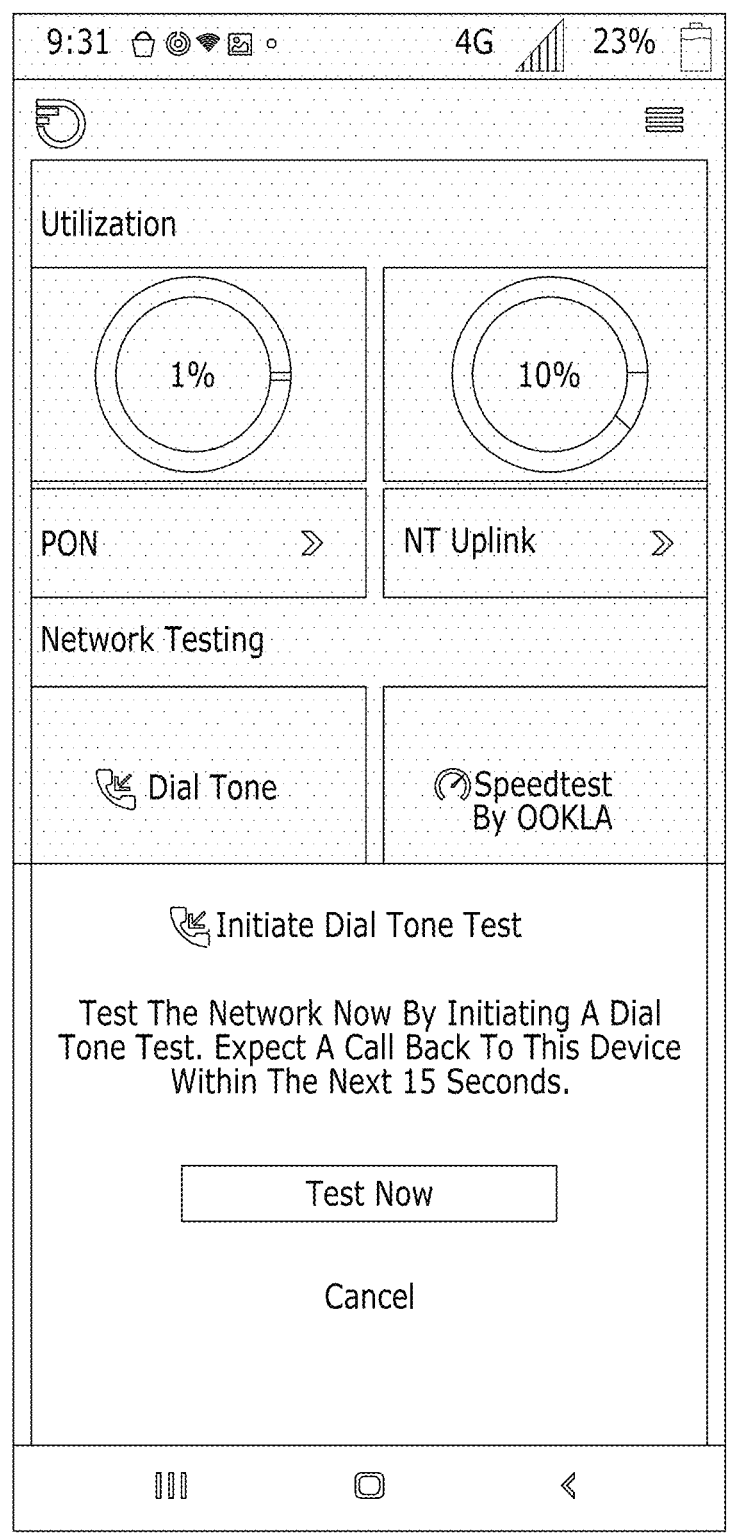
FIGS. 6A and 6B illustrate example displays of a PON repair application for executing a dial tone test for the ONT, which may be presented on a client device.
Figure 6B:
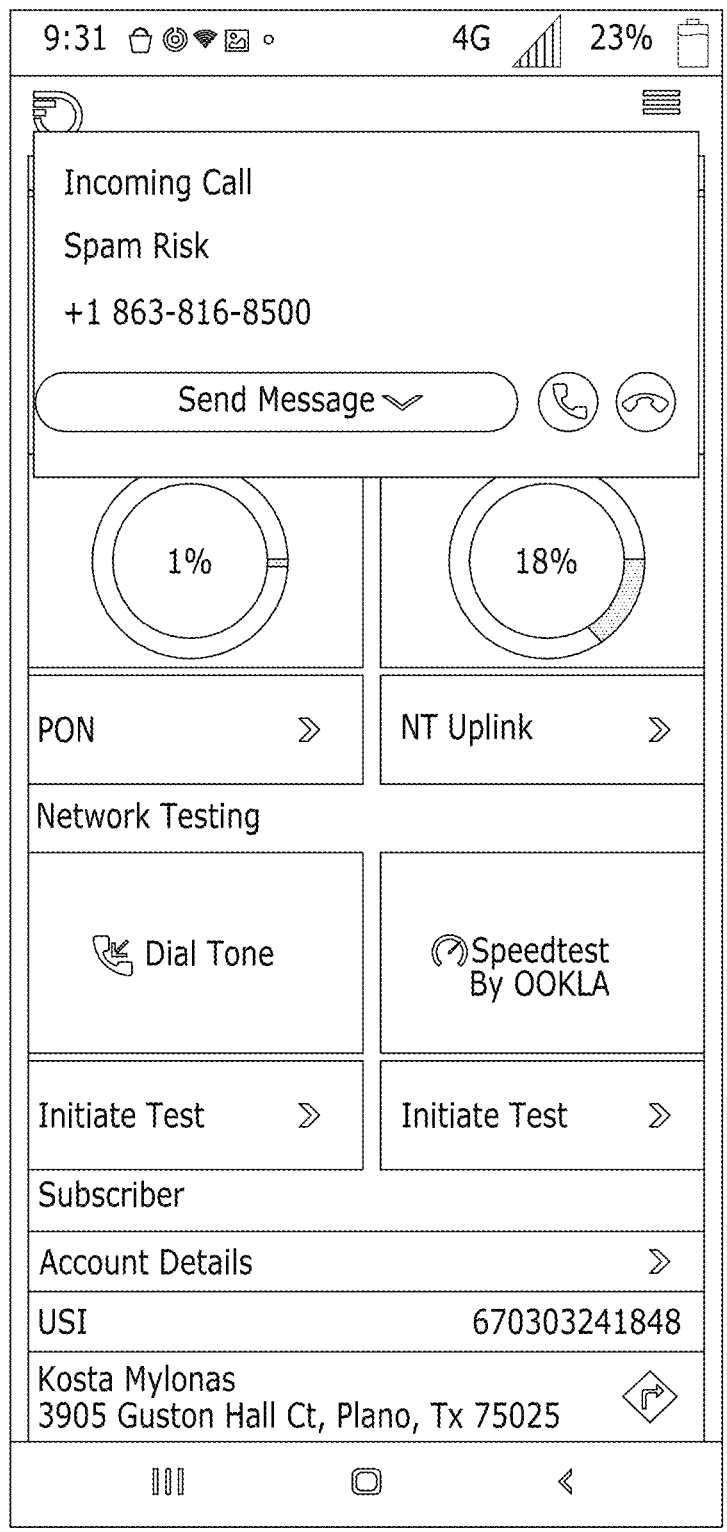
Figure 7:
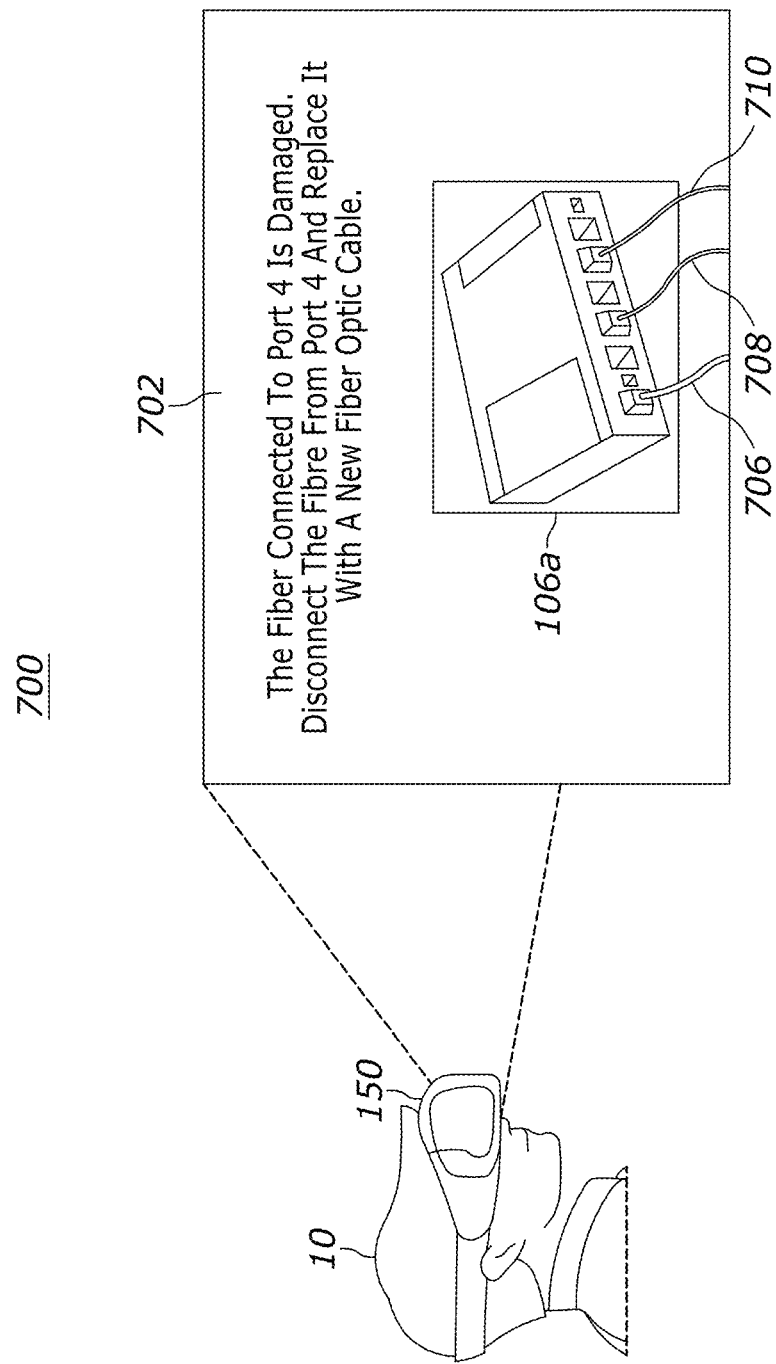
FIG. 7 illustrates an example transparent display of a client device with real-world imagery of the user's field of view which includes the ONT and step-by-step instructions for repairing the ONT overlaid on the transparent display.
Figure 8:
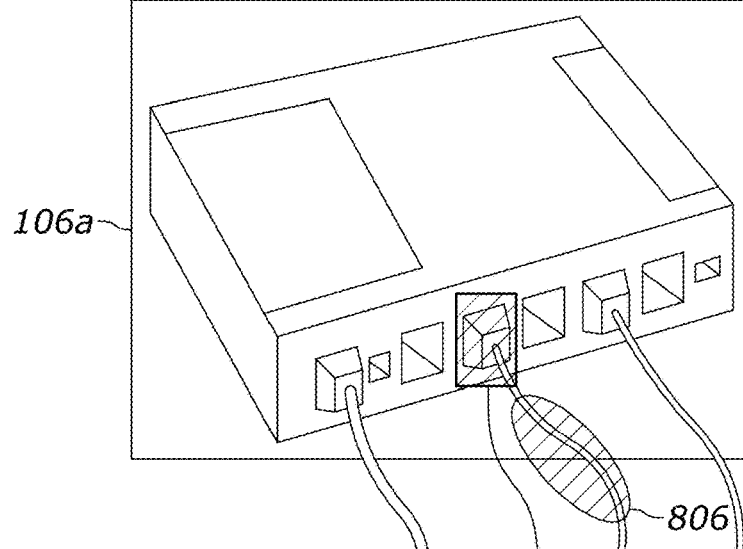
FIGS. 8 and 9 illustrate example transparent displays of the client device with real-world imagery of the user's field of view which includes the ONT and AR features overlaid on the transparent displays.
Figure 9:
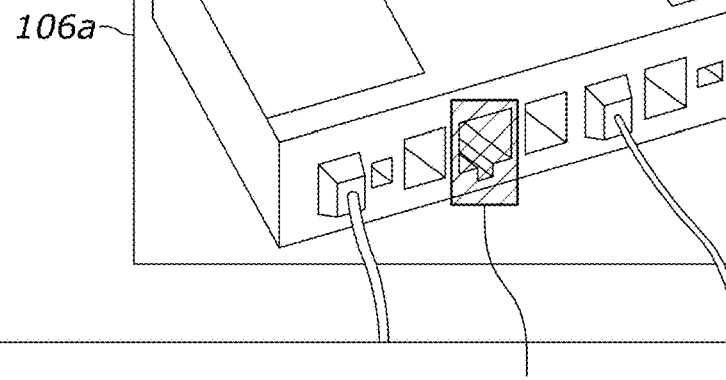

FIGS. 2A-3C illustrate example displays 200-360 for connecting to an ONT or other optical terminal which may be presented by the PON repair application on the client device 150. FIGS. 4A-6B illustrate example displays 400-650 for presenting diagnostic information and executing diagnostic tests which may be presented by the PON repair application on the client device 150. FIGS. 7-9 illustrate example displays 700-900 for providing instructions for repairing an ONT or other optical terminal which may be presented by the PON repair application on the client device 150. The screenshots shown in FIGS. 2A-9 are examples of what may be displayed to an user. As will be appreciated by those of ordinary skill in the relevant art(s), the exemplary screenshots shown in FIGS. 2A-9 are for illustrative purposes, and their associated functionality may be implemented using any suitable format and/or design for facilitating their corresponding described functionalities without departing from the spirit and scope of the present disclosure.

Figure 2A:
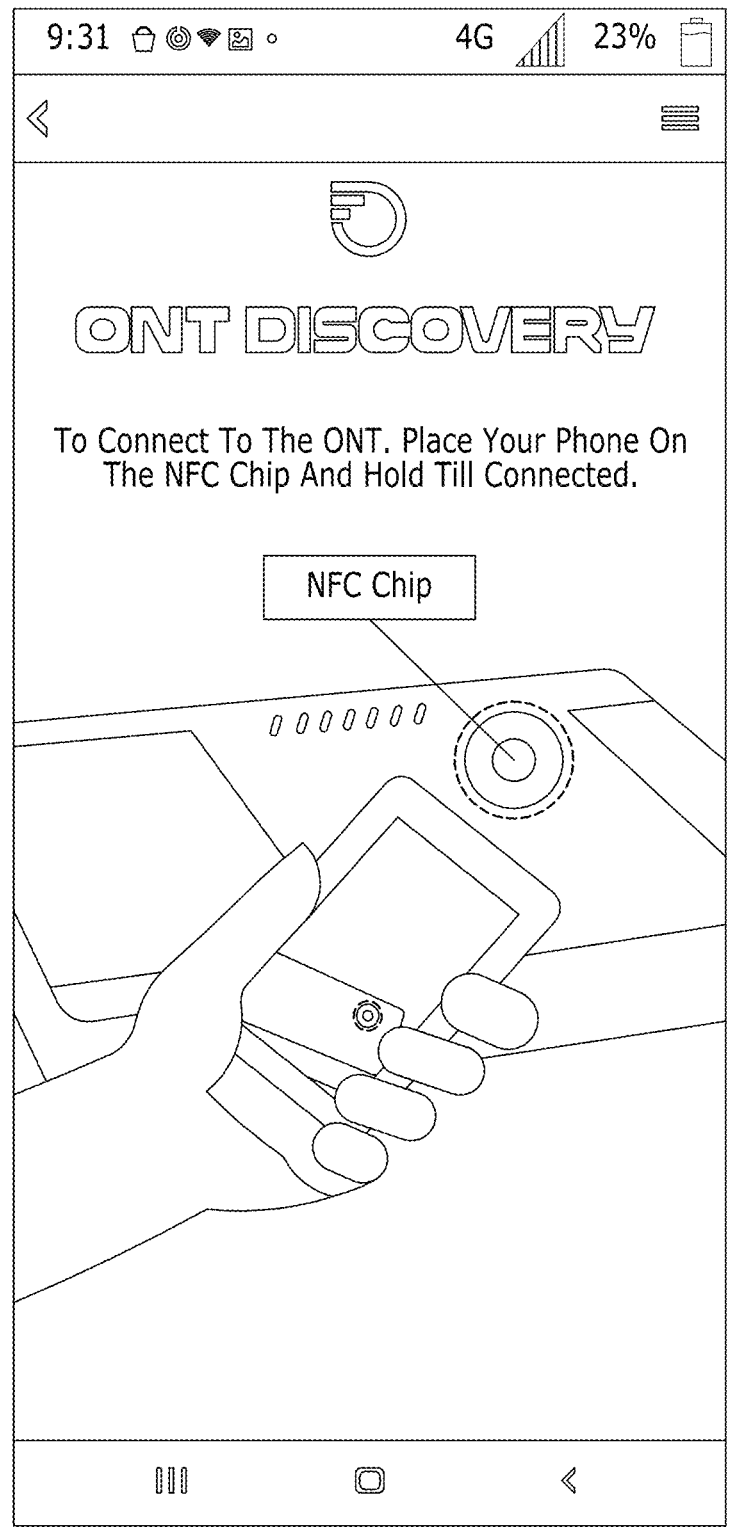
FIGS. 2A and 2B illustrate example displays of a PON repair application for connecting to an ONT using NFC, which may be presented on a client device.
Figure 2B:
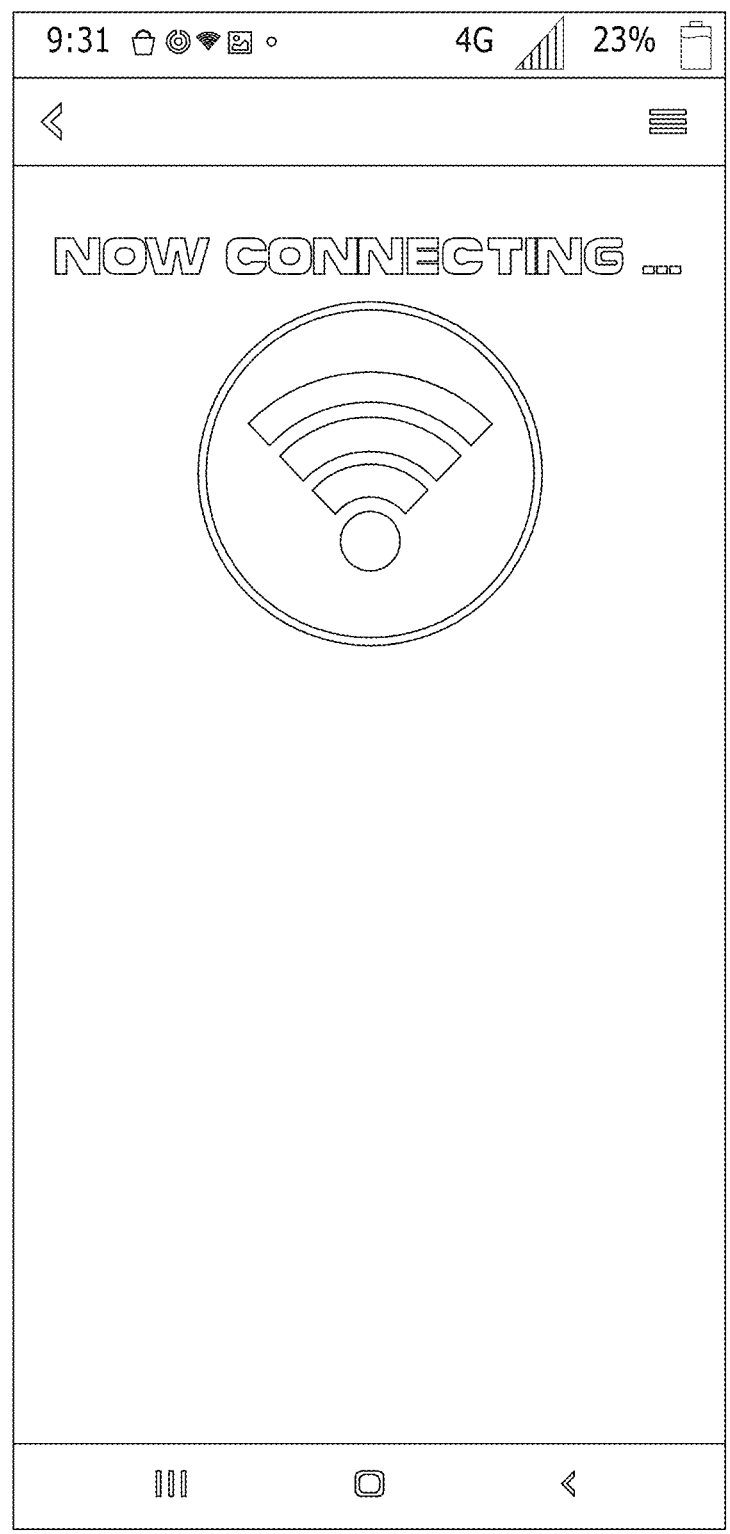

As shown in FIG. 2A, the PON repair application may present a display 200 with instructions for connecting to an ONT 106a using NFC. The display 200 may include instructions for connecting to the ONT 106a by tapping the client device 150 to an NFC chip on the ONT 106a. Then once the user taps the client device 150 to the ONT 106a, the PON repair application may present a display 250 indicating the client device 150 is connecting to the ONT 106a. The client device 150 may then pair with the ONT 106a and establish a communication session between the devices 150, 106a.

Figure 3A:
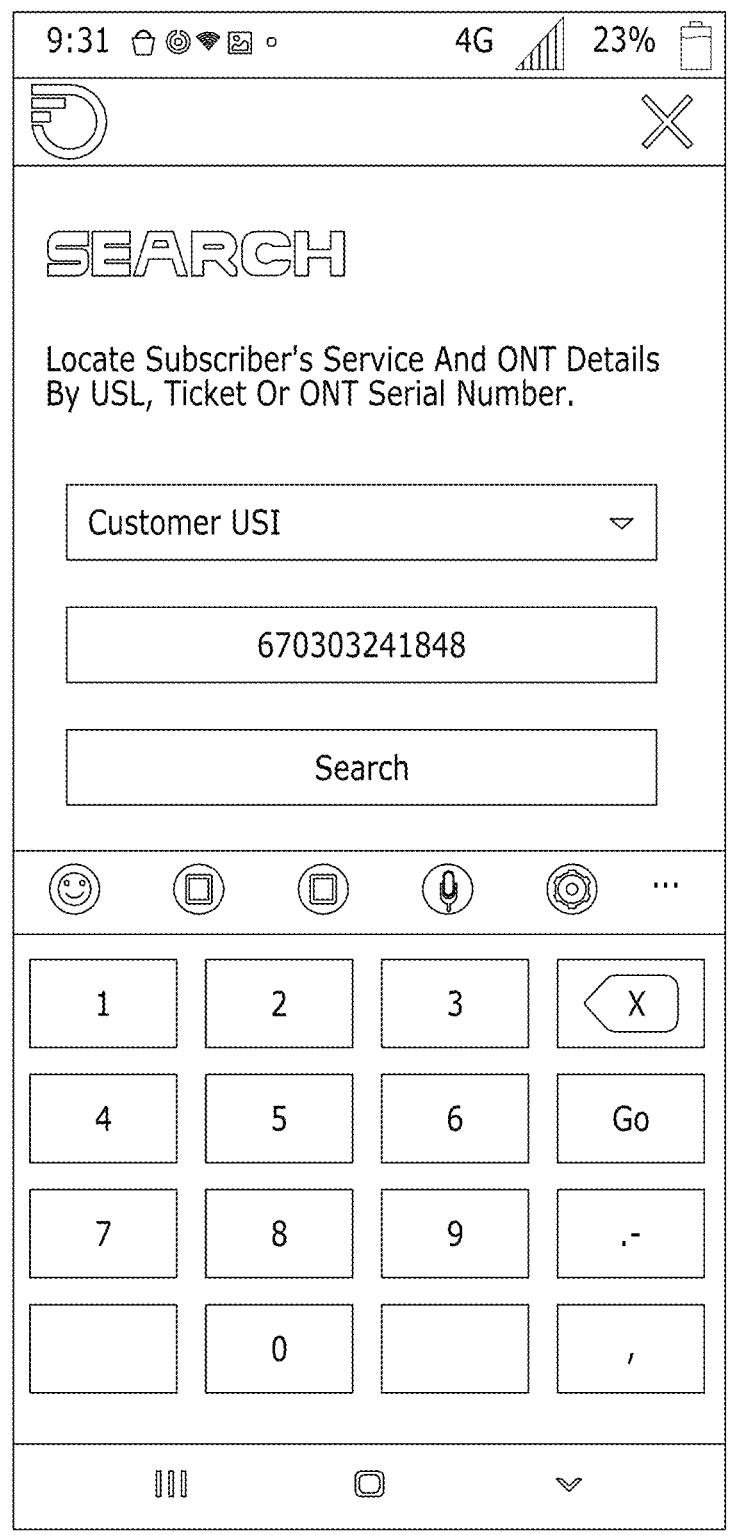
FIGS. 3A-3C illustrate example displays of a PON repair application for connecting to an ONT by searching for the ONT and identifying a Wi-Fi signal broadcasted by the ONT, which may be presented on a client device.
Figure 3B:
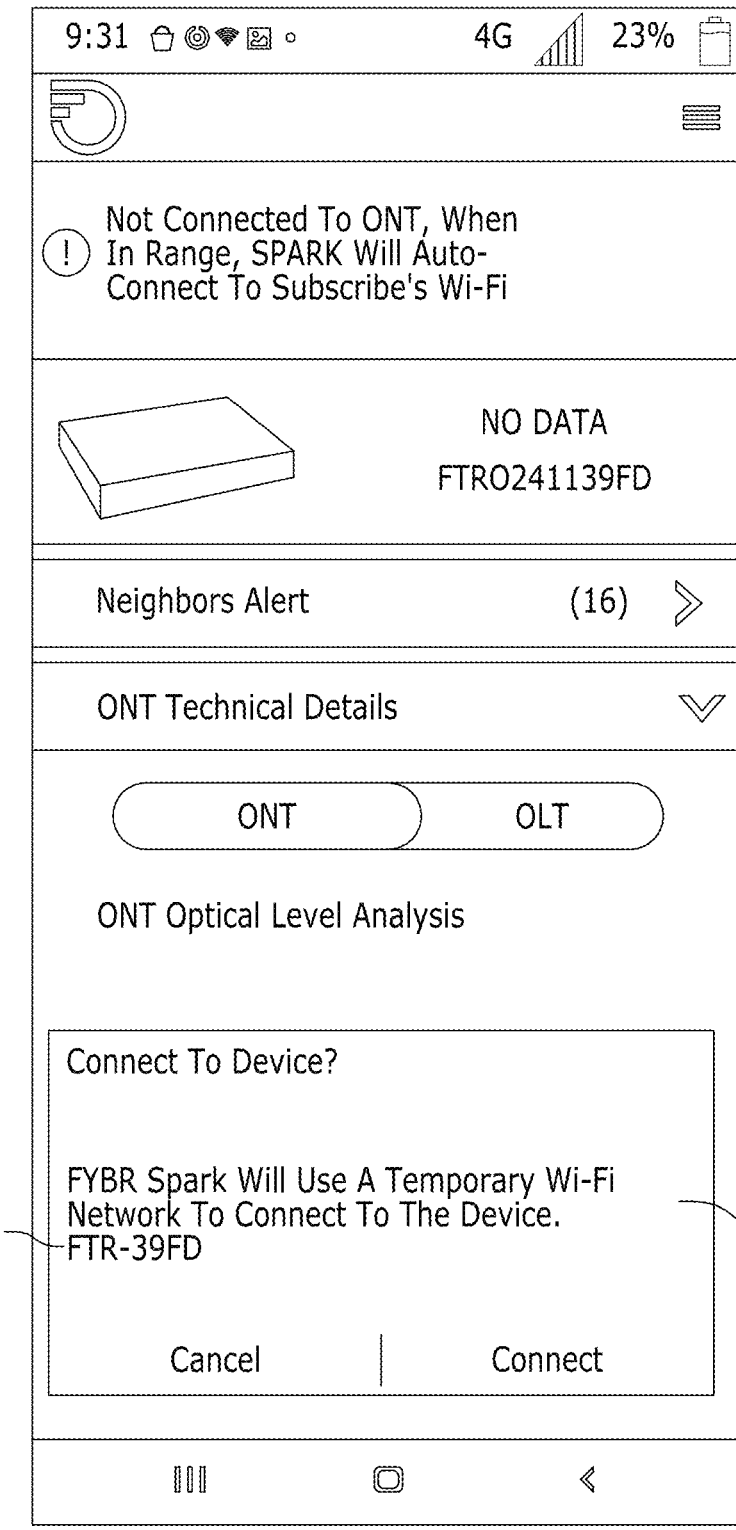

Additionally or alternatively, the client device 150 may connect to the ONT 106a using a Wi-Fi communication link. As shown in FIG. 3A, the PON repair application may present a search display 300 for searching for a Wi-Fi network for connecting to the ONT 106a by entering a customer identifier, an ONT serial number, or any other suitable identification information for the ONT 106a. A user such as a customer or a technician may enter the customer identifier or the ONT serial number in a search bar and select a user control to submit the search query. The PON repair application may then identify the ONT 106a based on the search query, and identify a Wi-Fi network for connecting to the ONT 106a. FIG. 3B illustrates an example search result display 330 indicating the Wi-Fi network 332 for connecting to the ONT 106a related to the search query and including a user control 334 for connecting to the Wi-Fi network. In response to receiving a selection of the user control 334 to connect to the Wi-Fi network 332, the PON repair application may automatically connect to the Wi-Fi network 332 when the client device 150 is within communication range of the Wi-Fi network. For example, once the client device 150 detects a Wi-Fi signal from the Wi-Fi network 332, the client device 150 may automatically connect to the Wi-Fi network 332.

In addition to entering identification information for the ONT 106a in a search bar to identify the short-range communication network for connecting to the ONT 106a, the ONT 106a may include a barcode, such as a quick response (QR) code on the surface of the ONT 106a with information for connecting to the short-range communication network. The client device 150 may capture an image of the barcode and analyze the image to obtain the information included in the barcode which may include the name of the Wi-Fi network, a password for connecting to the Wi-Fi network, etc.

Figure 3C:
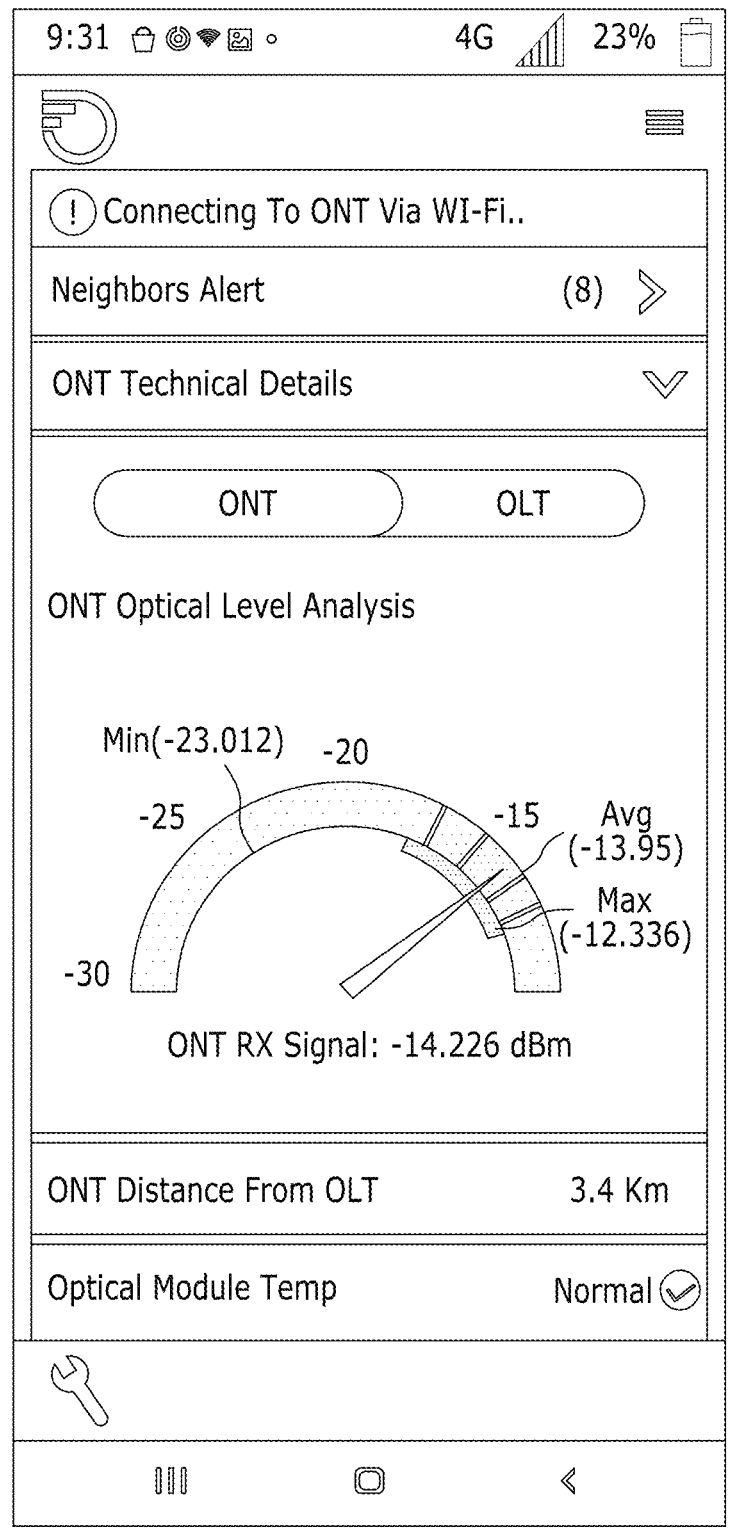

Then once the client device 150 connects to the ONT 106a via a short-range communication link, the PON repair application may receive and present diagnostic information from the ONT 106a as shown in the diagnostic display 360 of FIG. 3C.

Figure 4A:
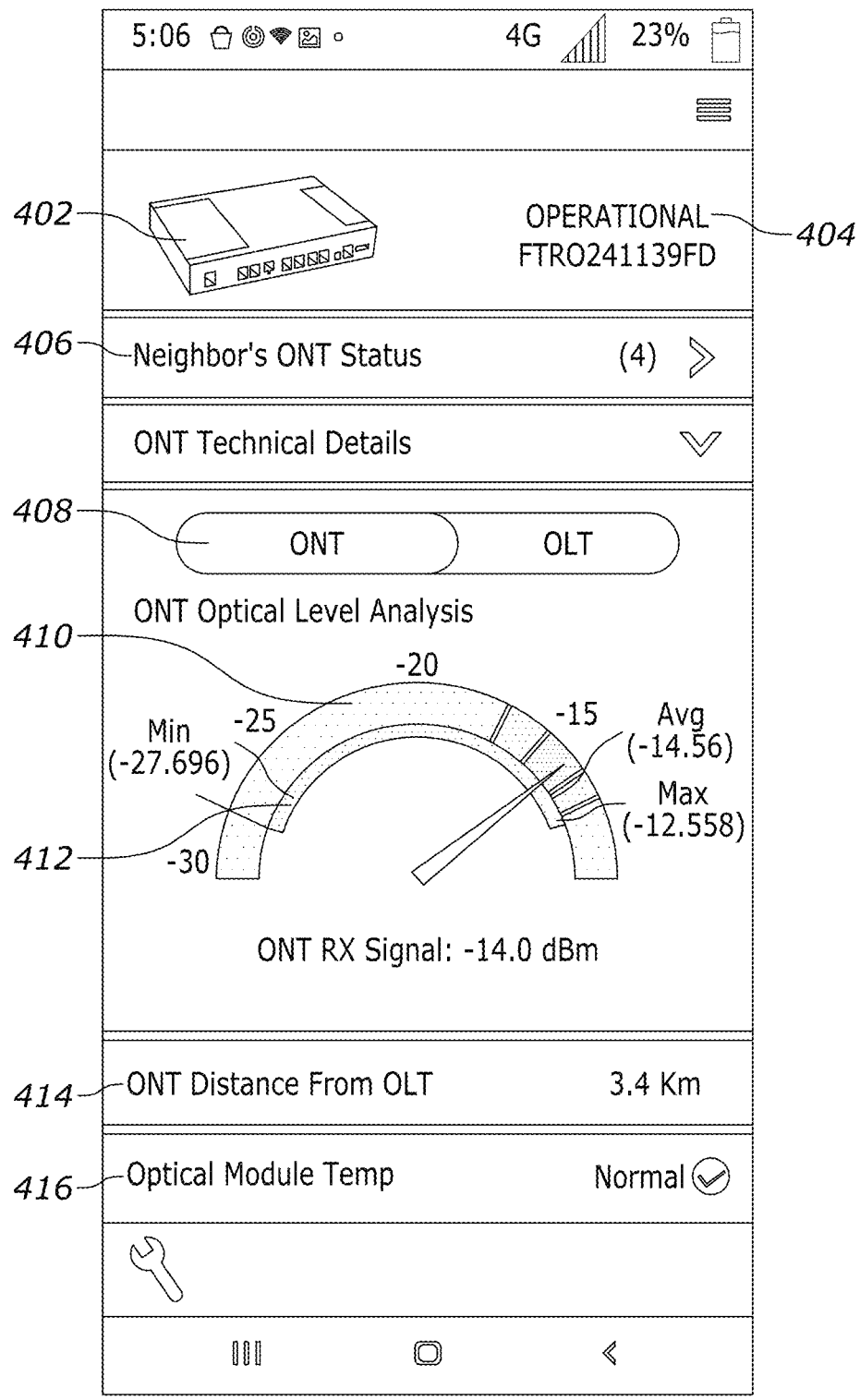
FIGS. 4A and 4B illustrate example displays of a PON repair application which include diagnostic information for the ONT and user controls for executing diagnostic tests on the ONT, which may be presented on a client device.
Figure 4B:
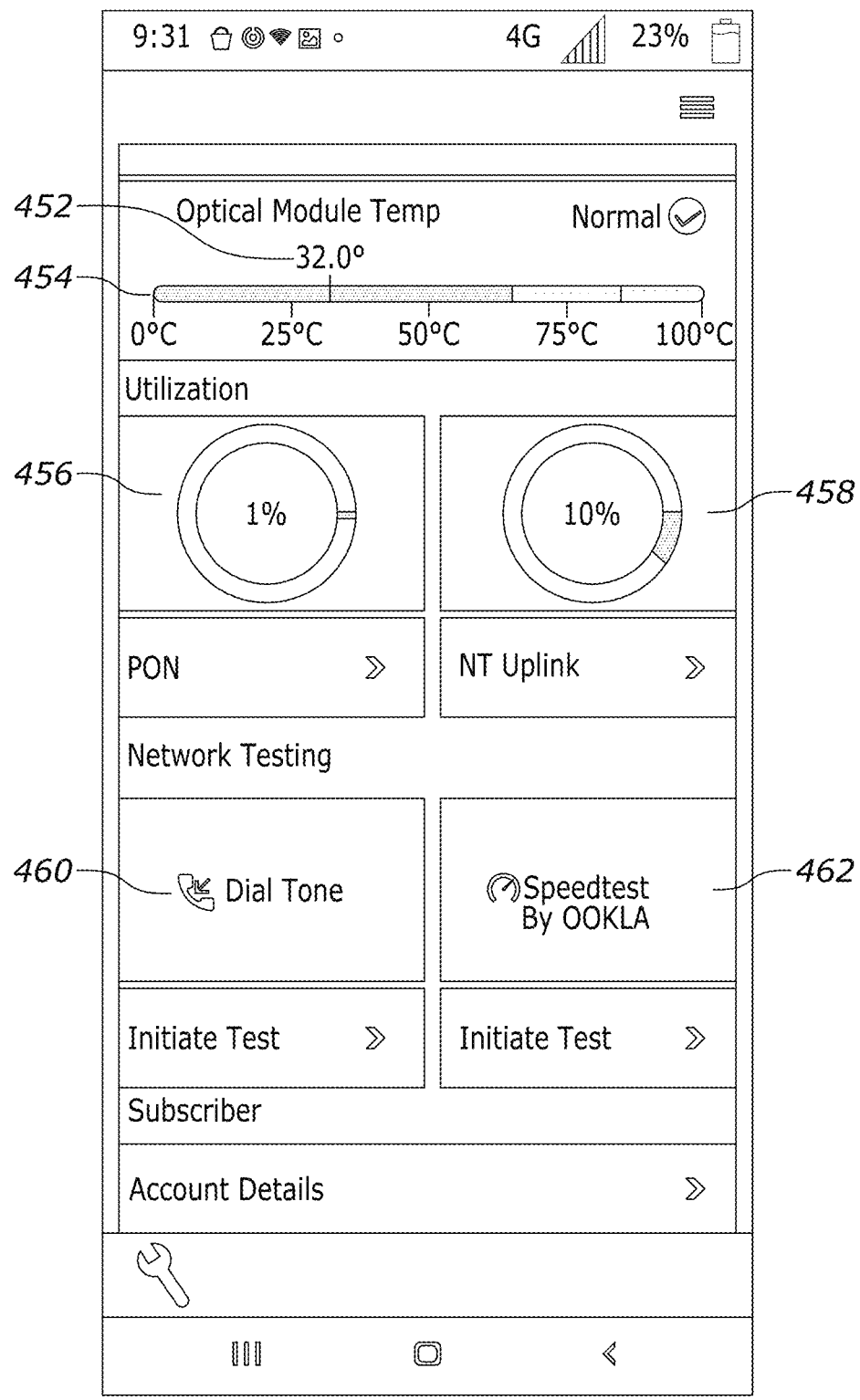

FIGS. 4A and 4B illustrate example diagnostic displays 400, 450 which may be presented by the PON repair application on the client device 150. For example, once the client device 150 connects to the ONT 106a via a short-range communication link, the PON repair application may receive real-time diagnostic information from the ONT 106a. If the client device 150 is not directly connected to the ONT 106a, the client device 150 may receive stored diagnostic information from the server 130 which may not be up to date. In any event, the diagnostic display 400 includes a graphic representation 402 of the ONT 106a and an indication of the operational status 404 of the ONT 106a. For example, the operational status 404 may indicate the ONT 106a is operational or is experiencing a failure and is unable to communicate with the OLT 102.

The diagnostic display 400 also includes an indication of statuses 406 of neighbors' ONTs. In this manner, the user may be able to determine that the ONT 106a is not the cause of the network failure and instead a neighbor's ONT is the cause of the network failure. Then the user may contact the neighbor to repair the neighbor's ONT.

Additionally, the diagnostic display 400 includes a user control 408 for selecting an optical terminal in which to present diagnostic information. For example, the user can select to view diagnostic information for the ONT 106a, the OLT 102, the FDH 116a, the FDT, etc. The ONT 106a may receive diagnostic information from the OLT 102, the FDH 116a, the FDT, and/or any other optical terminal and transmit the diagnostic information to the client device 150 via the short-range communication link. When the user control 408 is selected for viewing diagnostic information for the ONT 106a, the diagnostic display 400 presents a graphic representation 410 indicating the light level at the ONT 106a. The graphic representation 410 may include an indication of the ONT light level (−14.0 dBm), an indication of a minimum and maximum light level (−27.696 dBm, −12.558 dBm) for all of the ONTs on the PON, and an indication of an average light level (−14.56 dBm) for all of the ONTs on the PON. Additionally, the graphic representation 410 may include a light level meter gauge having green, yellow, and red color indicators to indicate good, fair, and poor light level ranges, respectively. Still further, the diagnostic display may include a graphic indicator 412 below the light level meter gauge 410 indicating the light level range of all ONTs within a threshold radius (e.g., 1 km) of the ONT 106a.

Moreover, the diagnostic display 400 may include an indication of the distance 414 from the ONT 106a to the OLT 102 (3.4 km) and an indication of the optical temperature 416 of the ONT 106a (Normal).

FIG. 4B illustrates another example diagnostic display 450 which may be presented by the PON repair application on the client device 150. For example, the diagnostic display 450 may be presented when the user scrolls down on the diagnostic display 400 of FIG. 4A. In other implementations, the diagnostic display 450 may be presented in response to receiving a selection of a user control on the diagnostic display 400 to view another page.

In any event, the diagnostic display 450 includes additional information about the optical temperature of the ONT 106a. More specifically, the additional information includes a temperature metric 452 (32.0°) and a graphic representation of a temperature gauge 454 having green, yellow, and red color indicators to indicate normal, hot, and very hot temperature ranges, respectively. Furthermore, the diagnostic display 450 includes utilization metrics for the ONT 106a. The utilization metrics include a PON utilization metric 456 (1%) and a network terminal (NT) uplink utilization metric 458 (10%).

Additionally, the diagnostic display 450 includes user controls 460, 462 for transmitting control signals to the ONT 106a to cause the ONT 106a to initiate diagnostic tests including a dial tone test 460 and a speed test 462. The client device 150 may then receive diagnostic information from the ONT 106a via the short-range communication link in response to the ONT 106a performing the diagnostic test. In response to selecting the user control 462 to initiate a speed test, the ONT 106a may receive the control signal from the client device 150 and begin executing a speed test to test the upload and download rates of the ONT 106a. Then the ONT 106a may transmit the results of the speed test to the client device 150 via the short-range communication link. When the user selects the user control 462 to initiate the speed test, the PON repair application may present a speed test display 500, as shown in FIG. 5.

The speed test display 500 may include a user control 502 for selecting a server for performing the speed test. Then the ONT 106a may perform the speed test by transmitting and receiving data to and from the selected server over the fiber optic network and determining upload and download rates of the communications with the selected server. The ONT 106a may provide the upload and download rates to the client device 150 via the short-range communication link. Then the speed test display 500 may present indications 504, 506 of the download and upload rates, respectively.

In response to selecting the user control 460 to initiate a dial tone test, the ONT 106a may receive a control signal from the client device 150 via the short-range communication link to call the client device 150. The client device 150 may also transmit the client device's phone number to the ONT 106a. Then the ONT 106a may begin executing the dial tone test to test whether the ONT 106a can successfully complete the call with the client device 150. Then the ONT 106a may call the client device 150 via the fiber optic network. When the user selects the user control 460 to initiate the dial tone test, the PON repair application may present a dial tone test display 600, as shown in FIG. 6A.

The dial tone test display 600 may include an indication that the user should expect a call back shortly. Then as shown in FIG. 6B, the client device 150 presents an indication of an incoming call for the user to accept with user controls for accepting or denying the call. The user can then determine that the ONT 106a passed the dial tone test by being able to initiate a call with the client device 150.

The user may use the diagnostic information from the diagnostic tests and/or from the displays 400-650 to determine the root cause of the network failure and repair or replace the ONT 106a or another device in the PON 100. For example, in some scenarios, the user may determine that the ONT 106a needs to be replaced and may swap the ONT 106a out with a replacement ONT. The user may also order a new ONT to be shipped to the user's residence, for example if the user is a customer and not a technician and does not have a replacement ONT.

In any event, the ONT 106a may transmit any suitable diagnostic information to the client device 150 via the short-range communication link which may assist the user in determining how to repair the ONT 106a or another device in the PON 100. The diagnostic information may include a download rate at the ONT 106a, an upload rate at the ONT 106a, a light level metric at the ONT 106, a distance from the ONT 106a to the OLT 102, a temperature metric at the ONT 106a, a PON utilization metric, an uplink metric for the ONT 106a, or any other suitable diagnostic information related to the ONT 106a and/or the PON 100. The diagnostic information may also include any suitable diagnostic information from the OLT 102, the FDH 116a, the FDT, or any other optical terminal in the PON 100. For example, the diagnostic information may further include diagnostic information from neighboring ONTs, so that the user can determine that a neighbor's ONT is the cause of the network failure. Then the user may contact the neighbor to repair the neighbor's ONT.

In addition to presenting diagnostic information on the client device 150, the PON repair application may generate and provide instructions for repairing the ONT 106*a* based on the diagnostic information. More specifically, the PON repair application may receive the diagnostic information from the client device 150 and may analyze the diagnostic information to determine the root cause of the network failure. Additionally, the PON repair application may receive other sensor data indicating the current environment around the ONT 106*a*. For example, the PON repair application may obtain images of the ONT 106*a* from the camera. In some scenarios such as when the client device 150 is smart glasses or a VR headset, the camera view may be same as the user's view and the PON repair application may obtain real-world images of the user's current view of optical equipment. The PON repair application may also receive infrared data via an infrared sensor at the client device 150. For example, the ONT 106*a* may transmit IR signals that indicate various issues with the ONT 106*a*.

The PON repair application may then analyze the sensor data indicating the current environment at the ONT 106*a* to determine the cause of the network failure. For example, the PON repair application may analyze the images to identify a blinking LED on the ONT. Each LED may signal a different issue and the LED may emit light with multiple blinking patterns or in multiple different colors which each signal a different issue. The PON repair application may then determine the cause of the network failure based on which LEDs are lit up, which color each LED emits, and/or which blinking pattern each LED emits (e.g., 5 consecutive blinks, two blinks followed by a 5 second pause followed by 2 more blinks, etc.). The PON repair application may analyze the images using object recognition and/or optical character recognition (OCR) techniques to identify the LEDs that are lit up and/or their blinking patterns.

More specifically, the PON repair application may analyze a portion (also referred to herein as an "object") of an image and identify features of the object within the image, such as the geometry of the edges of the object, and RGB pixel values or colors within the object.

These features may be identified by detecting stable regions within the object that are detectable regardless of blur, motion, distortion, orientation, illumination, scaling, and/or other changes in camera perspective. The stable regions may be extracted from the object using a scale-invariant feature transform (SIFT), speeded up robust features (SURF), fast retina keypoint (FREAK), binary robust invariant scalable keypoints (BRISK), or any other suitable computer vision techniques. In some embodiments, keypoints may be located at high-contrast regions of the object, such as edges within the object. A bounding box may be formed around a keypoint and the portion of the object created by the bounding box may be a feature.

In any event, the PON repair application may compare the features identified for the object to features from template objects (also referred to herein as "template features") using image classification and/or machine learning techniques, where the template objects may include optical terminals or components of optical terminals, such as LEDs on an optical terminal, ports, fibers connected to the optical terminal, etc. The machine learning techniques may include linear regression, polynomial regression, logistic regression, random forests, boosting, nearest neighbors, Bayesian networks, neural networks, support vector machines, or any other suitable machine learning technique. The template objects may also include other representations which are not of optical terminals. Then each of these template features may be compared to the features for an object.

In some embodiments, the template features may be compared to the features for an object using a nearest neighbors algorithm. The nearest neighbors algorithm may identify template features which are the closest to the features of the object by creating numerical representations of the features to generate feature vectors, such as a pixel width and height of the object, and RGB pixel values for the object. The numerical representations of the features or feature vectors of the object may be compared to the feature vectors of template objects to determine a vector distance between the features of the object and each template object. The PON repair application may then identify the object based on the amount of similarity, or the vector distance in the nearest neighbors algorithm, between the features for the object and the features for template objects. If the closest template objects represent an LED, the object is identified as an LED. If the closest template objects represent an ONT, the object is identified as an ONT. Additionally, if the closest template objects represent a fiber, the object is identified as a fiber.

In any event, the PON repair application may identify an LED in an image and identify the signal to which the LED corresponds based on the shape of the LED or based on text which is adjacent to the LED. For example, if the text is "Power," the PON repair application may determine that the LED represents a power signal and if the LED is off, the PON repair application may determine that the power is off for the ONT 106*a*. Additionally, if the text is "Service," the PON repair application may determine that the LED represents an Internet service signal. If the LED is off, the PON repair application may determine that the ONT 106*a* is not connected to an Internet service provider.

In another example, the PON repair application may analyze the images to determine that a fiber is bent. For example, the PON repair application may identify the fiber using the objection recognition techniques described above. The PON repair application may then determine the geometry of the identified fiber and if the fiber curves at an angle which is more than a threshold angle (e.g., 45 degrees), the PON repair application may determine that the fiber is bent. In yet another example, the PON repair application may determine that the fiber is dirty, for example based on the colors of the fiber or based on the ONT 106*a* detecting Rayleigh scattering in the fiber according to attenuation in the detected light level. In another example, the PON repair application may determine that the fiber is broken by detecting cracks or breaks in the fiber.

The PON repair application may also analyze the diagnostic information from the ONT 106*a* and/or other sensor data to determine that the fiber is broken or bent. In other implementations, the PON repair application may analyze the diagnostic information and/or other sensor data to determine that the fiber is the cause of the network failure. Then the PON repair application may instruct the user to look at the fiber to determine whether the fiber is broken, bent, or dirty and to repair the ONT 106*a* accordingly based on the user's findings.

In addition to identifying issues with the fiber, the PON repair application may analyze the diagnostic information from the ONT 106*a* and/or other sensor data to determine that the ONT 106*a* needs to be replaced, that the ONT 106*a* needs to be reset (e.g., by turning the power on and off), that an outlet powering the ONT 106a needs to be reset, that an Ethernet cable connected to the ONT 106a needs to be replaced, that an optical splitter needs to be replaced 114a, etc.

Then in response to determining the cause of the network failure, the PON repair application may generate and provide instructions for repairing the ONT 106a. For example, when a fiber is bent, the PON repair application may generate instructions to straighten out the fiber. When the fiber is dirty, the PON repair application may generate instructions for cleaning the fiber. When the fiber is broken, the PON repair application may generate instructions for replacing the fiber with another fiber. In another example, when the ONT 106a needs to be reset, the PON repair application may generate instructions for resetting the ONT 106a. When the ONT 106a is not receiving power from the outlet, the PON repair application may generate instructions for resetting the outlet to the ONT 106a. Furthermore, when the ONT 106a needs to be replaced, the PON repair application may generate instructions for removing the current ONT 106a and installing a new ONT.

While these are a few examples of the causes of network failures and corresponding instructions for repairing the network failures, the PON repair application may identify any suitable cause of a network failure and generate corresponding instructions for repairing the network failure according to the identified cause.

In any event, the PON repair application may then present the instructions to the user for example, as step-by-step instructions as the user repairs the ONT 106a. The PON repair application may present the instructions audibly via a speaker of the client device 150 or visually on a display. In some scenarios, the PON repair application may transition to an augmented reality mode that presents real-world imagery on a transparent display in the field of view of the client device 150, and more specifically the camera view of the camera. The real-world imagery may be the user's view of the area in front of them so that they may view the instructions as they are repairing the ONT 106a. In some implementations, the PON repair application may overlay the instructions on the transparent display in a display area within the transparent display that does not obstruct the user's view of the ONT 106a. The PON repair application may identify the ONT 106a within the real-world imagery using the object recognition techniques described above. Then the PON repair application may identify a display area within the real-world imagery that does not obstruct the ONT 106a. For example, the display area may be above, below, to the left, or to the right of the ONT 106a. The PON repair application may overlay the instructions on the real-world imagery within the identified display area.

In this manner, when the client device 150 is smart glasses or a VR headset, the user may look at the ONT 106a and see instructions for repairing the ONT 106a in their field of view as they repair the ONT 106a. When the client device 150 is a tablet or smart phone, the user may also be able to hold their tablet or smart phone up to the ONT 106a and see the instructions for repairing the ONT 106a.

In addition to overlaying text instructions on the real-world imagery in the augmented reality mode, the PON repair application may overlay augmented reality features on the real-world imagery to assist the user in repairing the ONT 106a or other optical terminal, such as graphics or icons which highlight portions of the real-world imagery. For example, when the instructions are to examine a particular fiber, the PON repair application may identify the location of the particular fiber within the real-world imagery using the object recognition techniques described above. For example, the PON repair application may identify the fiber and identify the pixel coordinates of the fiber within the real-world imagery. Then the PON repair application may overlay a graphic at the identified location for the fiber to highlight the fiber relative to other objects within the image. For example, the graphic may be the same size and shape as the fiber in a bright yellow color, so that the fiber appears bright yellow and is easily noticeable by the user.

More generally, the PON repair application may identify location(s) within the real-world imagery for the user to view and may overlay augmented reality feature(s) at those location(s). FIG. 7 illustrates an example transparent display 700 of a client device 150 with real-world imagery in the field of view of a user 10, where the PON repair application is in an augmented reality mode. The real-world imagery includes the ONT 106a. Additionally, the transparent display includes a set of step-by-step instructions 702 for repairing the ONT 106a in a text format. The set of step-by-step instructions 702 are presented within a display area which does not obstruct the ONT 106a. In this manner, the user may view and repair the ONT 106a while viewing the instructions 702. The real-world imagery also includes a power cord 706 connected to a power outlet for the ONT 106a, and two optical fibers 708, 710 connected to ports 4 and 8 of the ONT 106a, respectively. The instructions 702 are to disconnect the fiber 708 from port 4 and replace it with a new fiber optic cable.

In some implementations, the transparent display may present one instruction at a time and present a new instruction once the previous instruction has been completed. FIG. 8 illustrates an example transparent display 800 of the client device 150 with real-world imagery of the user's field of view. The transparent display 800 includes a first instruction 802 for repairing the ONT 106a which is to remove the fiber optic cable from port 4. To assist the user in identifying the fiber optic cable and port 4, the PON repair application overlays a first augmented reality feature 804 over port 4 and a second augmented reality feature 806 over the fiber. While the first and second augmented reality features 804, 806 are depicted as semi-transparent rectangular and oval shapes, respectively, the augmented reality features may be any suitable size, shape, or color to highlight or assist the user in viewing a particular portion of the real-world imagery.

In any event, in response to determining that the first instruction 802 has been completed, for example by analyzing updated real-world imagery to determine that the fiber optic cable has been removed from port 4, the transparent display 800 may present a second instruction 902 and/or overlay new AR features for the second instruction 902. In other implementations, the user may select a user control to indicate that the instruction has been completed. FIG. 9 illustrates another example transparent display 900 of the client device 150 with updated real-world imagery of the user's field of view. The transparent display 900 includes a second instruction 902 for repairing the ONT 106a which is to insert the new fiber optic cable into port 4. To assist the user in identifying port 4, the PON repair application overlays an augmented reality feature 904 over port 4. The augmented reality feature 904 may be the same augmented reality feature 804 overlayed over port 4 for the first instruction 802 or may be a different augmented reality feature.

Figure 10:
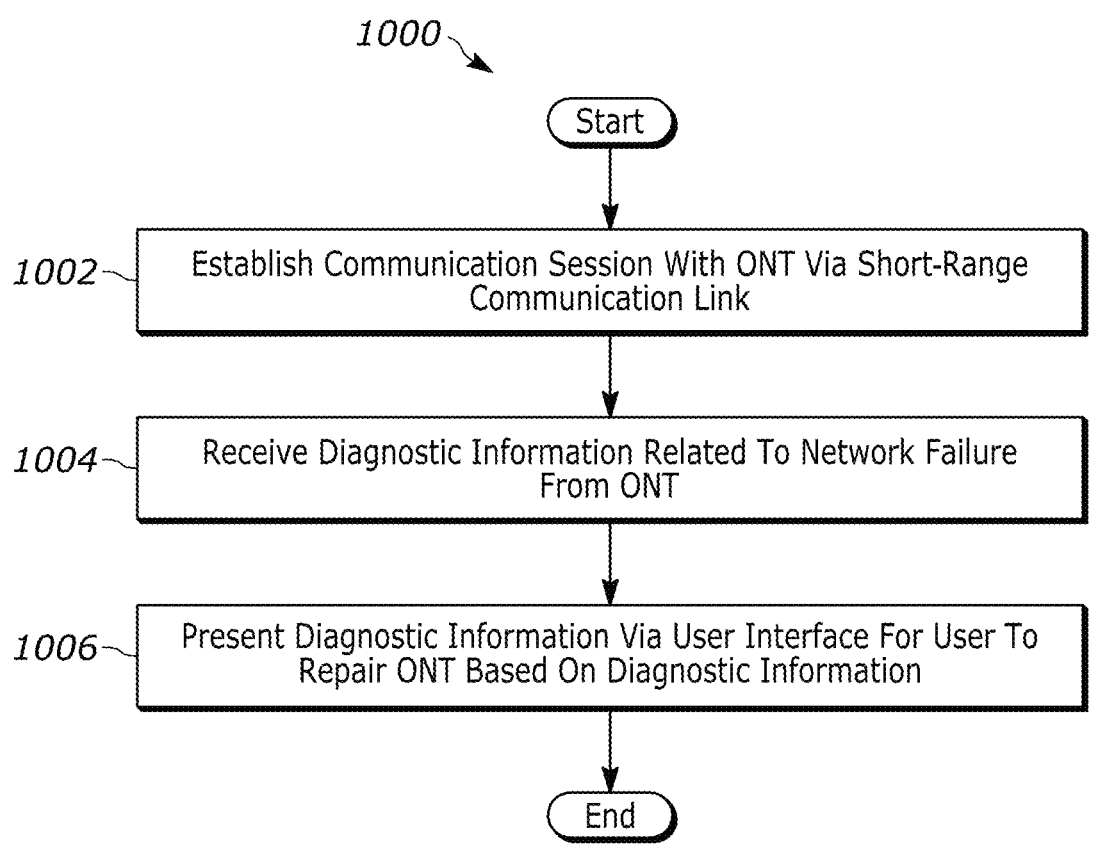
FIG. 10 is a flowchart representative of an example method for repairing a network failure in a PON, which may be performed by a client device of FIG. 1.

FIG. 10 depicts a flow diagram of an example method 1000 for repairing a network failure in a PON 100. The method 1000 may be performed by the client device 150. At block 1002, the client device 150 establishes a communication session with the ONT 106*a* via a short-range communication link. For example, the client device 150 and the ONT 106*a* may connect using Wi-Fi, Bluetooth, or NFC. More specifically, a user may tap the client device 150 to the ONT 106*a* to cause the PON repair application to transmit an NFC signal to the ONT 106*a* requesting to pair the devices. The ONT 106*a* may receive the NFC signal and establish a communication session between the two devices 150, 106*a* in response to the request. In another example, the ONT 106*a* may broadcast a Wi-Fi signal. When the client device 150 is within communication range of the ONT 106*a*, the PON repair application may receive the Wi-Fi signal and may request to connect to the ONT 106*a* via the broadcasted Wi-Fi network.

Then at block 1004, in response to establishing the communication session, the client device 150 receives diagnostic information related to a network failure from the ONT 106*a* via the short-range communication link. The diagnostic information may be real-time diagnostic information collected at the ONT 106*a*. Additionally, the diagnostic information may include diagnostic information collected at the OLT 102, FDH 116*a*, or FDT and transmitted to the ONT 106*a* via the fiber optic network or a Wi-Fi network. The diagnostic information may include a download rate at the ONT 106*a*, an upload rate at the ONT 106*a*, a light level metric at the ONT 106*a*, a distance from the ONT 106*a* to the OLT 102, a temperature metric at the ONT 106*a*, a PON utilization metric, an uplink metric for the ONT 106*a*, etc.

At block 1006, the client device 150 presents the diagnostic information via a user interface. The user may then determine the cause of the network failure and/or repair the ONT 106*a* using the diagnostic information.

Figure 11:
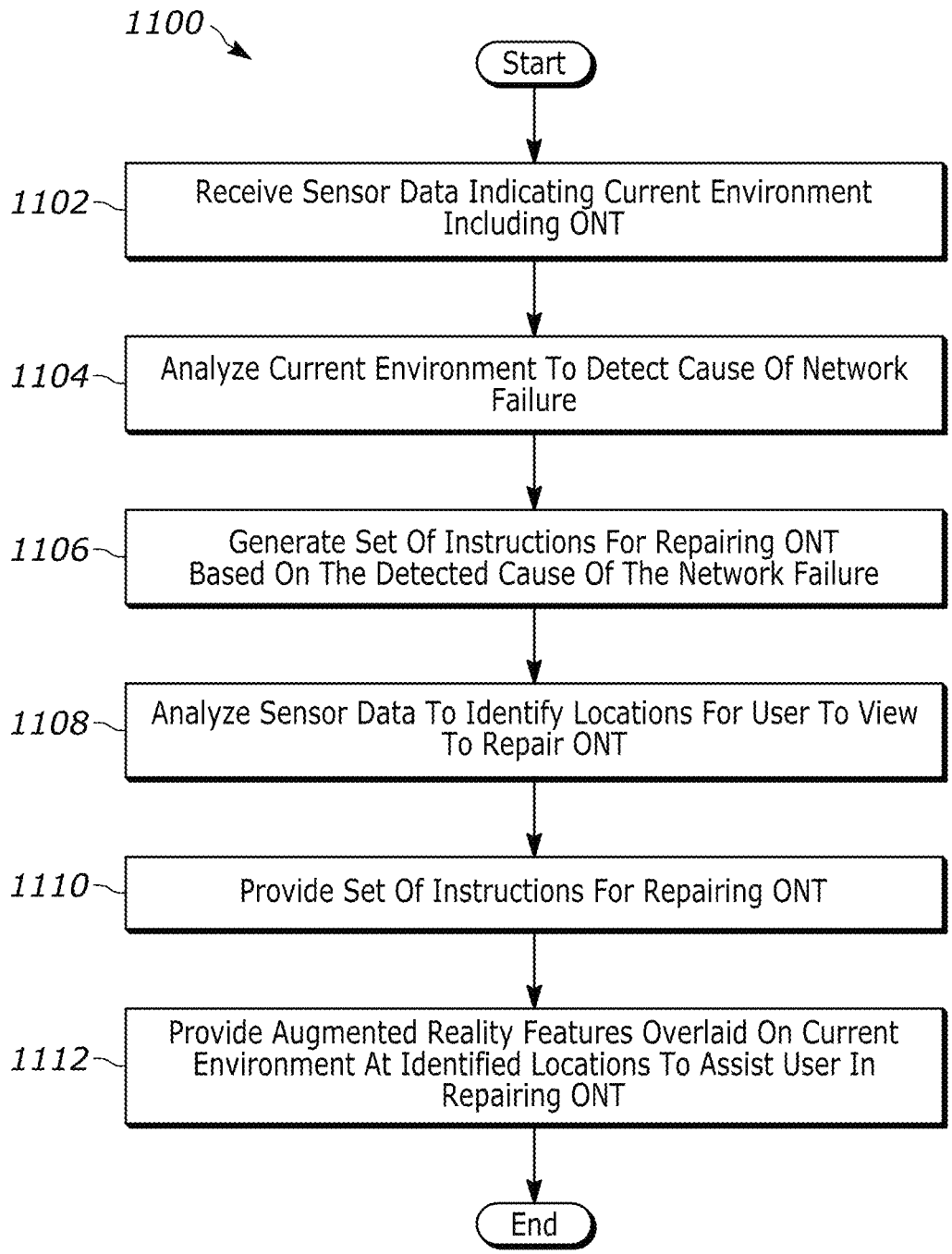
FIG. 11 is a flowchart representative of an example method for augmenting repair of a network failure in a PON, which may be performed by a client device of FIG. 1.

FIG. 11 depicts a flow diagram of an example method 1100 for augmenting repair of a network failure in a PON. The method 1000 may be performed by the client device 150, the server 130, or any suitable combination of the two. At block 1102, the client device 150 receives sensor data indicative of the current environment at the ONT 106*a*. The sensor data may include wireless communication signals from the ONT 106*a* via a short-range communication network which include diagnostic information collected at the ONT 106*a*. The diagnostic information may be diagnostic information determined by performing a diagnostic test, such as a dial tone test or a speed test. The sensor data may also include wireless communication signals from the FDH 116*a*, FDT, or OLT 102 optically coupled to the ONT 106*a*. Additionally, the sensor data may include infrared signals from the ONT 106*a* and/or images of the ONT 106*a*. The images may depict real-world imagery of the user's field of view or a camera view of the client device 150.

The client device 150 analyzes the current environment using the sensor data to determine the cause of a network failure related to the ONT 106*a* (block 1104). For example, the network failure may be due to the ONT 106*a*, one or more fibers connected to the ONT 106*a*, the FDH 116*a*, the FDT, and/or the OLT. Some example network failure causes may include a dirty, bent, or broken fiber, a broken Ethernet cable, a lack of power to the ONT 106*a*, a faulty ONT 106*a* which may require a reset of the ONT 106*a* or replacement, or another faulty piece of optical equipment, such as a faulty FDH, FDT, splitter, or a neighbor's ONT.

Then at block 1106, the client device 150 generates a set of instructions for repairing the ONT 106*a* based on detected cause of the network failure. For example, when a fiber is bent, the client device 150 may generate instructions to straighten out the fiber. When the fiber is dirty, the client device 150 may generate instructions for cleaning the fiber. When the fiber is broken, the client device 150 may generate instructions for replacing the fiber with another fiber. In another example, when the ONT 106*a* needs to be reset, the client device 150 may generate instructions for resetting the ONT 106*a*. When the ONT 106*a* is not receiving power from the outlet, the client device 150 may generate instructions for resetting the outlet to the ONT 106*a*. Furthermore, when the ONT 106*a* needs to be replaced, the client device 150 may generate instructions for removing the current ONT 106*a* and installing a new ONT.

The client device 150 may also analyze the sensor data to identify locations within real-world imagery to highlight when instructing the user on how to repair the ONT 106*a* (block 1108). For example, when the instructions are to examine a particular fiber, the client device 150 may identify the location of the particular fiber within the real-world imagery using the object recognition techniques described above. For example, the client device 150 may identify the fiber and identify the pixel coordinates of the fiber within the real-world imagery.

At block 1110, the client device 150 provides the set of instructions for repairing the ONT 106*a*. The client device 150 may present the instructions audibly via a speaker of the client device 150 or visually on a display. In some scenarios, the client device 150 may transition to an augmented reality mode that presents real-world imagery on a transparent display in the field of view of the client device 150, and more specifically the camera view of the camera. The real-world imagery may be the user's view of the area in front of them so that they may view the instructions as they are repairing the ONT 106*a*. In some implementations, the client device 150 may overlay the instructions on the transparent display in a display area within the transparent display that does not obstruct the user's view of the ONT 106*a*.

Additionally, the client device 150 provides augmented reality features overlaid on the real-world imagery at the identified locations to assist the user in repairing the ONT 106*a* (block 1112). The augmented reality features may be graphics or icons which highlight portions of the real-world imagery. For example, the client device 150 may overlay a graphic at the identified location for the fiber to highlight the fiber relative to other objects within the image. The graphic may be the same size and shape as the fiber in a bright yellow color, so that the fiber appears bright yellow and is easily noticeable by the user.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

1A. A method for repairing a network failure in a Passive Optical Network (PON), the method comprising: establishing a communication session, by a client device via a short-range communication link, with an optical network terminal (ONT) in a PON; in response to establishing the communication session, receiving, at the client device from the ONT via the short-range communication link, diagnostic information related to a network failure corresponding to the ONT; and presenting, by the client device, the diagnostic information to a user for the user to repair the ONT based on the received diagnostic information.

2A. The method of example 1A, further comprising: transmitting, by the client device to the ONT via the short-range communication link, a request for the ONT to perform a diagnostic test; and receiving, at the client device from the ONT via the short-range communication link, the diagnostic information in response to the ONT performing the diagnostic test.

3A. The method of any of the preceding examples, wherein the diagnostic test includes at least one of: a dial tone test to test whether the ONT can successfully complete a call with the client device or a speed test to test download or upload rates at the ONT.

4A. The method of any of the preceding examples, wherein the short-range communication link is at least one of: a Wi-Fi communication link, a near field communication (NFC) link, or a Bluetooth communication link.

5A. The method of any of the preceding examples, wherein establishing the communication session includes: receiving, at the client device, a signal from the ONT broadcasted via the Wi-Fi communication link; transmitting, by the client device via the Wi-Fi communication link, a request to connect to the ONT in response to receiving the signal, wherein the communication session is established in response to the ONT receiving the request.

6A. The method of any of the preceding examples, wherein establishing the communication session includes: transmitting, by the client device via the NFC link, a request to pair the client device with the ONT, wherein the communication session is established in response to the ONT receiving the request.

7A. The method of any of the preceding examples, wherein establishing the communication session includes: receiving, at the client device, a search query including identification information for the ONT; identifying, by the client device, the ONT based on the search query; detecting, by the client device, a short-range communication signal from the identified ONT; and transmitting, by the client device, a request to connect to the ONT in response to receiving the short-range communication signal.

8A. The method of any of the preceding examples, wherein the diagnostic information includes at least one of: a download rate at the ONT, an upload rate at the ONT, a light level metric at the ONT, a distance from the ONT to an optical line terminal (OLT), a temperature metric at the ONT, a PON utilization metric, or an uplink metric for the ONT.

9A. A client device for repairing a network failure in a Passive Optical Network (PON), the client device comprising: one or more processors; a non-transitory computer-readable memory storing instructions thereon that, when executed by the one or more processors, cause the client device to: establish, via a short-range communication link, a communication session with an optical network terminal (ONT) in a PON; in response to establishing the communication session, receive, from the ONT via the short-range communication link, diagnostic information related to a network failure corresponding to the ONT; and present the diagnostic information to a user for the user to repair the ONT based on the received diagnostic information.

10A. The client device of example 9A, wherein the instructions further cause the client device to: transmit, to the ONT via the short-range communication link, a request for the ONT to perform a diagnostic test; and receive, from the ONT via the short-range communication link, the diagnostic information in response to the ONT performing the diagnostic test.

11A. The client device of example 9A or example 10A, wherein the diagnostic test includes at least one of: a dial tone test to test whether the ONT can successfully complete a call with the client device or a speed test to test download or upload rates at the ONT.

12A. The client device of any of examples 9A to 11A, wherein the short-range communication link is at least one of: a Wi-Fi communication link, a near field communication (NFC) link, or a Bluetooth communication link.

13A. The client device of any of examples 9A to 12A, wherein to establish the communication session, the instructions cause the client device to: receive a signal from the ONT broadcasted via the Wi-Fi communication link; and transmit, via the Wi-Fi communication link, a request to connect to the ONT in response to receiving the signal, wherein the communication session is established in response to the ONT receiving the request.

14A. The client device of any of examples 9A to 13A, wherein to establish the communication session, the instructions cause the client device to: transmit, via the NFC link, a request to pair the client device with the ONT, wherein the communication session is established in response to the ONT receiving the request.

15A. The client device of any of examples 9A to 14A, wherein to establish the communication session, the instructions cause the client device to: receive a search query including identification information for the ONT; identify the ONT based on the search query; detect a short-range communication signal from the identified ONT; and transmit a request to connect to the ONT in response to receiving the short-range communication signal.

16A. The client device of any of examples 9A to 15A, wherein the diagnostic information includes at least one of: a download rate at the ONT, an upload rate at the ONT, a light level metric at the ONT, a distance from the ONT to an optical line terminal (OLT), a temperature metric at the ONT, a PON utilization metric, or an uplink metric for the ONT.

17A. A non-transitory computer-readable memory storing instructions thereon that, when executed by one or more processors, cause the one or more processors to: establish, via a short-range communication link, a communication session with an optical network terminal (ONT) in a PON; in response to establishing the communication session, receive, from the ONT via the short-range communication link, diagnostic information related to a network failure corresponding to the ONT; and present the diagnostic information to a user for the user to repair the ONT based on the received diagnostic information.

18A. The non-transitory computer-readable memory of example 17A, wherein the instructions further cause the one or more processors to: transmit, to the ONT via the short-range communication link, a request for the ONT to perform a diagnostic test; and receive, from the ONT via the short-range communication link, the diagnostic information in response to the ONT performing the diagnostic test.

19A. The non-transitory computer-readable memory of example 17A or example 18A, wherein the diagnostic test includes at least one of: a dial tone test to test whether the ONT can successfully complete a call with the client device or a speed test to test download or upload rates at the ONT.

20A. The non-transitory computer-readable memory of any of examples 17A to 19A, wherein the short-range communication link is at least one of: a Wi-Fi communication link, a near field communication (NFC) link, or a Bluetooth communication link.

1B. A method for augmenting repair of a network failure in a Passive Optical Network (PON), the method comprising: receiving, via one or more sensors in a client device, sensor data indicating a current environment that includes an optical network terminal (ONT) in a PON, the PON including an optical line terminal (OLT) optically connected to the ONT via one or more optical fibers; analyzing, by the client device, the current environment to detect a cause of a network failure corresponding to the ONT; generating, by the client device, a set of instructions for repairing the ONT based on the detected cause of the network failure; and providing, by the client device, the set of instructions for a user to follow to repair the ONT, wherein the set of instructions are provided as the user repairs the ONT.

2B. The method of example 1B, wherein providing the set of instructions includes: providing, by the client device, the set of instructions via a transparent display overlaying the user's field of view, wherein the ONT is within the user's field of view in the transparent display and the set of instructions are presented within a display area which does not obstruct the ONT.

3B. The method of example 1B or example 2B, wherein providing the set of instructions includes providing, by the client device, a set of audio instructions via a speaker.

4B. The method of any of example 1 B to 3B, further comprising: analyzing, by the client device, the current environment to identify one or more locations for the user to view to repair the ONT; and providing, by the client device via a transparent display overlaying the user's field of view, one or more augmented reality features overlaid on the user's real-world view of the current environment at the identified one or more locations which assist the user in repairing the ONT.

5B. The method of any of example 1B to 4B, wherein the receiving sensor data indicating the current environment includes receiving, at the client device, via the one or more sensors, at least one of: one or more images depicting a field of view of the user which includes the ONT, one or more infrared signals from the ONT, one or more wireless communication signals from the ONT, or one or more wireless communication signals from a fiber distribution hub (FDH) or fiber distribution terminal (FDT) optically coupled to the ONT.

6B. The method of any of example 1B to 5B, wherein the one or more wireless communication signals from the ONT include diagnostic information for the ONT determined by performing one or more diagnostic tests.

7B. The method of any of example 1B to 6B, wherein the set of instructions for repairing the ONT are generated based on the diagnostic information.

8B. A client device for augmenting repair of a network failure in a Passive Optical Network (PON), the client device comprising: one or more sensors; one or more processors; a non-transitory computer-readable memory storing instructions thereon that, when executed by the one or more processors, cause the client device to: receive, via the one or more sensors, sensor data indicating a current environment including an optical network terminal (ONT) in a PON, the PON including an optical line terminal (OLT) optically connected to the ONT via one or more optical fibers; analyze the current environment to generate a set of instructions for repairing the ONT; and provide the set of instructions for a user to follow to repair the ONT, wherein the set of instructions are provided as the user repairs the ONT.

9B. The client device of example 8B, further comprising a transparent display overlaying the user's field of view, wherein the set of instructions are provided via the transparent display, and wherein the ONT is within the user's field of view in the transparent display and the set of instructions are presented within a display area which does not obstruct the ONT.

10B. The client device of example 8B or example 9B, further comprising a speaker, wherein the set of instructions are provided as a set of audio instructions via the speaker.

11B. The client device of any of examples 8B to 10B, further comprising a transparent display overlaying the user's field of view, wherein the instructions further cause the client device to: analyze the current environment to identify one or more locations for the user to view to repair the ONT; and provide, via the transparent display, one or more augmented reality features overlaid on the user's real-world view of the current environment at the identified one or more locations which assist the user in repairing the ONT.

12B. The client device of any of examples 8B to 11B, wherein the sensor data includes at least one of: one or more images depicting a field of view of the user which includes the ONT, one or more electromagnetic signals at the client device, one or more infrared signals from the ONT, one or more wireless communication signals from the ONT, or one or more wireless communication signals from a fiber distribution hub (FDH) or fiber distribution terminal (FDT) optically coupled to the ONT.

13B. The client device of any of examples 8B to 12B, wherein the one or more wireless communication signals from the ONT include diagnostic information for the ONT determined by performing one or more diagnostic tests.

14B. The client device of any of examples 8B to 13B, wherein the set of instructions for repairing the ONT are generated based on the diagnostic information.

15B. A non-transitory computer-readable memory storing instructions thereon that, when executed by one or more processors, cause the one or more processors to: receive, via one or more sensors, sensor data indicating a current environment including an optical network terminal (ONT) in a PON, the PON including an optical line terminal (OLT) optically connected to the ONT via one or more optical fibers; analyze the current environment to generate a set of instructions for repairing the ONT; and provide the set of instructions for a user to follow to repair the ONT, wherein the set of instructions are provided as the user repairs the ONT.

16B. The non-transitory computer-readable memory of example 15B, wherein the set of instructions are provided via a transparent display, and wherein the ONT is within the user's field of view in the transparent display and the set of instructions are presented within a display area which does not obstruct the ONT.

17B. The non-transitory computer-readable memory of example 15B or example 16B, wherein the set of instructions are provided as a set of audio instructions via the speaker.

18B. The non-transitory computer-readable memory of any of examples 15B to 17B, wherein the instructions further cause the one or more processors to: analyze the current environment to identify one or more locations for the user to view to repair the ONT; and provide, via a transparent display, one or more augmented reality features overlaid on the user's real-world view of the current environment at the identified one or more locations which assist the user in repairing the ONT.

19B. The non-transitory computer-readable memory of any of examples 15B to 18B, wherein the sensor data includes at least one of: one or more images depicting a field of view of the user which includes the ONT, one or more electromagnetic signals at the client device, one or more infrared signals from the ONT, one or more wireless communication signals from the ONT, or one or more wireless communication signals from a fiber distribution hub (FDH) or fiber distribution terminal (FDT) optically coupled to the ONT.

20B. The non-transitory computer-readable memory of any of examples 15B to 19B, wherein the one or more wireless communication signals from the ONT include diagnostic information for the ONT determined by performing one or more diagnostic tests.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for augmenting repair of a network failure in a Passive Optical Network (PON), the method comprising:
   receiving, via one or more sensors in a client device, sensor data indicating a current environment that includes an optical network terminal (ONT) in the PON, including presenting, via a user interface, a display including a user control for performing a dial tone test or a speed test with the ONT, wherein the sensor data includes diagnostic information for the ONT determined based on results of the dial tone test or the speed test;
   analyzing, by the client device, the current environment to detect a cause of the network failure corresponding to the ONT;
   generating, by the client device, a set of instructions for repairing the ONT based on the detected cause of the network failure; and
   providing, via the user interface by the client device, the set of instructions for the user to follow to repair the ONT including:
      identifying a first display area within real-world imagery of the ONT that does not obstruct the ONT in accordance with a first field of view of the user;
      providing a first instruction via a transparent display overlaying the first field of view of the user with a first augmented reality feature overlaid on the real-world imagery of the ONT to highlight a first component of the ONT corresponding to the first instruction, wherein the ONT is within the first field of view of the user in the transparent display and the first instruction is presented within the first display area which does not obstruct the ONT; and
      in response to detecting that the first instruction has been completed:
      identifying a second display area within the real-world imagery of the ONT that does not obstruct the ONT in accordance with a second field of view of the user; and
      providing a second instruction via the transparent display overlaying the second field of view of the user with a second augmented reality feature overlaid on the real-world imagery of the ONT to highlight a second component of the ONT corresponding to the second instruction, wherein the ONT is within the second field of view of the user in the transparent display and the second instruction is presented within the second display area which does not obstruct the ONT.

2. The method of claim 1, wherein providing the set of instructions includes providing, by the client device, a set of audio instructions via a speaker.

3. The method of claim 1, further comprising:
analyzing, by the client device, the current environment to identify a location of the first component for the user to view to repair the ONT; and
providing, by the client device via the transparent display, the first augmented reality feature overlaid on a real-world view of the user of the current environment at the identified location which assists the user in repairing the ONT.

4. The method of claim 1, wherein the receiving the sensor data indicating the current environment includes receiving, at the client device, via the one or more sensors, at least one of:
one or more images depicting the first field of view of the user which includes the ONT,
one or more infrared signals from the ONT,
one or more wireless communication signals from the ONT, or
one or more wireless communication signals from a fiber distribution hub (FDH) or fiber distribution terminal (FDT) optically coupled to the ONT.

5. The method of claim 1, wherein detecting that the first instruction has been completed includes:
analyzing, by the client device, updated real-world imagery to determine that the first instruction has been completed.

6. A client device for augmenting repair of a network failure in a Passive Optical Network (PON), the client device comprising:
one or more sensors;
one or more processors;
a non-transitory computer-readable memory storing computer-readable instructions thereon that, when executed by the one or more processors, cause the client device to:
receive, via the one or more sensors, sensor data indicating a current environment including an optical network terminal (ONT) in the PON including presenting, via a user interface, a display including a user control for performing a dial tone test or a speed test with the ONT, wherein the sensor data includes diagnostic information for the ONT determined based on results of the dial tone test or the speed test;
analyze the current environment to generate a set of instructions for repairing the ONT; and
provide the set of instructions for a user to follow to repair the ONT including:
identify a first display area within real-world imagery of the ONT that does not obstruct the ONT in accordance with a first field of view of the user;
provide a first instruction via a transparent display overlaying the first field of view of the user with a first augmented reality feature overlaid on the real-world imagery of the ONT to highlight a first component of the ONT corresponding to the first instruction, wherein the ONT is within the first field of view of the user in the transparent display and the first instruction is presented within the first display area which does not obstruct the ONT; and
in response to detecting that the first instruction has been completed:
identify a second display area within the real-world imagery of the ONT that does not obstruct the ONT in accordance with a second field of view of the user; and
provide a second instruction via the transparent display overlaying the second field of view of the user with a second augmented reality feature overlaid on the real-world imagery of the ONT to highlight a second component of the ONT corresponding to the second instruction, wherein the ONT is within the second field of view of the user in the transparent display and the second instruction is presented within the second display area which does not obstruct the ONT.

7. The client device of claim 6, further comprising a speaker, wherein the set of instructions are provided as a set of audio instructions via the speaker.

8. The client device of claim 6, wherein the computer-readable instructions further cause the client device to:
analyze the current environment to identify a location of the first component for the user to view to repair the ONT; and
provide, via the transparent display, the first augmented reality feature overlaid on a real-world view of the user of the current environment at the identified location which assists the user in repairing the ONT.

9. The client device of claim 6, wherein the sensor data includes at least one of:
one or more images depicting the first field of view of the user which includes the ONT,
one or more electromagnetic signals at the client device,
one or more infrared signals from the ONT,
one or more wireless communication signals from the ONT, or
one or more wireless communication signals from a fiber distribution hub (FDH) or fiber distribution terminal (FDT) optically coupled to the ONT.

10. The client device of claim 6, wherein to detect that the first instruction has been completed, the computer-readable instructions cause the client device to:
analyze updated real-world imagery to determine that the first instruction has been completed.

11. A non-transitory computer-readable memory storing computer-readable instructions thereon that, when executed by one or more processors, cause the one or more processors to:
receive, via one or more sensors, sensor data indicating a current environment including an optical network terminal (ONT) in a Passive Optical Network (PON) including presenting, via a user interface, a display including a user control for performing a dial tone test or a speed test with the ONT, wherein the sensor data includes diagnostic information for the ONT determined based on results of the dial tone test or the speed test;
analyze the current environment to generate a set of instructions for repairing the ONT; and
provide the set of instructions for a user to follow to repair the ONT including:
identify a first display area within real-world imagery of the ONT that does not obstruct the ONT in accordance with a first field of view of the user;

provide a first instruction via a transparent display overlaying the first field of view of the user with a first augmented reality feature overlaid on the real-world imagery of the ONT to highlight a first component of the ONT corresponding to the first instruction, wherein the ONT is within the first field of view of the user in the transparent display and the first instruction is presented within the first display area which does not obstruct the ONT; and in response to detecting that the first instruction has been completed:

identify a second display area within the real-world imagery of the ONT that does not obstruct the ONT in accordance with a second field of view of the user; and provide a second instruction via the transparent display overlaying the second field of view of the user with a second augmented reality feature overlaid on the real-world imagery of the ONT to highlight a second component of the ONT corresponding to the second instruction, wherein the ONT is within the second field of view of the user in the transparent display and the second instruction is presented within the second display area which does not obstruct the ONT.

12. The non-transitory computer-readable memory of claim 11, wherein the set of instructions are provided as a set of audio instructions via a speaker.

13. The non-transitory computer-readable memory of claim 11, wherein the computer-readable instructions further cause the one or more processors to:

analyze the current environment to identify a location of the first component for the user to view to repair the ONT; and provide, via the transparent display, the first augmented reality feature overlaid on a real-world view of the user of the current environment at the identified location which assists the user in repairing the ONT.

14. The non-transitory computer-readable memory of claim 11, wherein the sensor data includes at least one of:

one or more images depicting the first field of view of the user which includes the ONT, one or more infrared signals from the ONT, one or more electromagnetic signals at the client device, one or more wireless communication signals from the ONT, or one or more wireless communication signals from a fiber distribution hub (FDH) or fiber distribution terminal (FDT) optically coupled to the ONT.

* * * * *